United States Patent
Rowe et al.

(10) Patent No.: US 7,362,886 B2
(45) Date of Patent: Apr. 22, 2008

(54) AGE-BASED FACE RECOGNITION

(75) Inventors: Simon Michael Rowe, Berkshire (GB); Richard Ian Taylor, Berkshire (GB)

(73) Assignee: Canon Kabushiki Kaisha, Tokyo (JP)

( * ) Notice: Subject to any disclaimer, the term of this patent is extended or adjusted under 35 U.S.C. 154(b) by 659 days.

(21) Appl. No.: 10/856,755

(22) Filed: Jun. 1, 2004

(65) Prior Publication Data

US 2004/0247177 A1     Dec. 9, 2004

(30) Foreign Application Priority Data

Jun. 5, 2003   (GB)  ................................ 0312945.9
Jun. 5, 2003   (GB)  ................................ 0312946.7

(51) Int. Cl.
  *G06K 9/00*    (2006.01)
(52) U.S. Cl. ...................................... 382/118
(58) Field of Classification Search ................. 382/118
  See application file for complete search history.

(56) References Cited

U.S. PATENT DOCUMENTS

| | | | |
|---|---|---|---|
| 4,276,570 A * | 6/1981 | Burson et al. ............... | 382/276 |
| 5,781,650 A * | 7/1998 | Lobo et al. .................. | 382/118 |
| 5,835,616 A * | 11/1998 | Lobo et al. .................. | 382/118 |
| 6,356,659 B1 | 3/2002 | Wiskott et al. .............. | 382/209 |
| 6,418,235 B1 | 7/2002 | Morimoto et al. .......... | 382/118 |
| 7,035,406 B2 * | 4/2006 | Machida et al. ............. | 380/30 |
| 2002/0067856 A1 | 6/2002 | Fujii et al. .................... | 382/218 |
| 2002/0106114 A1 | 8/2002 | Yan et al. ..................... | 382/118 |
| 2003/0099409 A1 | 5/2003 | Rowe .......................... | 382/285 |
| 2003/0123713 A1 | 7/2003 | Geng .......................... | 382/118 |
| 2003/0123734 A1 | 7/2003 | Li et al. ....................... | 382/190 |
| 2003/0201996 A1 | 10/2003 | Rowe .......................... | 345/582 |
| 2003/0202686 A1 | 10/2003 | Rowe .......................... | 382/118 |
| 2004/0197013 A1* | 10/2004 | Kamei ......................... | 382/118 |

FOREIGN PATENT DOCUMENTS

| | | |
|---|---|---|
| EP | 1 211 638 | 6/2002 |
| GB | 2 308 712 | 7/1997 |
| GB | 2 396 504 | 6/2004 |
| JP | 11-194051 | 7/1999 |
| WO | WO 01/37222 | 5/2001 |

OTHER PUBLICATIONS

Lanitis, Andreas, Chris J. Taylor, and Timothy F. Cootes. "Toward Automatic Simulation of Aging Effects on Face Images". IEEE Transations on Pattern Analysis and Machine Intelligence. vol. 24, No. 4, Apr. 2002. pp. 442-456.*

(Continued)

*Primary Examiner*—Brian Werner
*Assistant Examiner*—Damon Conover
(74) *Attorney, Agent, or Firm*—Fitzpatrick, Cella, Harper & Scinto

(57) ABSTRACT

In an image processing apparatus, a face recognizer is trained using images of one or more faces to generate representation data for the face recognizer characterising the face(s). Face recognition processing is then performed using the representation data. The training and face recognition processing is performed taking into account a person's age.

8 Claims, 16 Drawing Sheets

Fig. 1

OTHER PUBLICATIONS

Lanitis, Andreas and Chris J. Taylor. "Towards Automatic Face Identification Robust to Ageing Variation". Proceedings of the Fourth IEEE International Conference on Automatic Face and Gesture Recognition: 2000.*

Lanitis, Andreas and Chris J. Taylor. "Robust Face Recognition Using Automatic Age Normalization". $10^{th}$ Mediterranean Electrotechnical Conference: 2000. vol. 11. pp. 478-481.*

Hayashi, J. M. Yasumoto, H. Ito, and H. Koshimizu. "A Method for Estimating and Modeling Age and Gender using Facial Image Processing". Proceedings of the Seventh International Conference on Virtual Systems and Multimedia: 2001.*

"Adaptive Least Squares Correlation: A Powerful Image Matching Technique" by Gruen in Photogrammatry Remote Sensing and Cartography, 1985, pp. 175-187.

"Eigenfaces for Recognition" by Turk and Pentland in the Journal of Cognitive Neuroscience, vol. 3, No. 1, pp. 71-86.

"Exemplar-based Face Recognition from Video" by Krueger and Zhou in ECCV 2002 Seventh European Conference on Computer Vision, Proceedings Part IV, pp. 732-746.

"Face Recognition: A Convolutional Neural Network Approach" by Lawrence et al in IEEE Transactions on Neural Networks, Special Issue on Neural Networks and Pattern Recognition, vol. 8, No. 1, pp. 98-113, 1997.

"Multilayer Perceptron in Face Recognition" by Oravec available at www.electronicsletters.com, paper Oct. 11, 2001 ISSN 1213-161X.

"A Morphable Model for the Synthesis of 3D Faces" by Blanz and Vetter in Proceedings of SIGGRAPH '99, pp. 187-194.

"Face Recognition Using Eigenfaces" by Turk and Pentland in Computer Vision and Pattern Recognition, 1991, IEEE Proceedings CVPR '91, pp. 586-591.

* cited by examiner

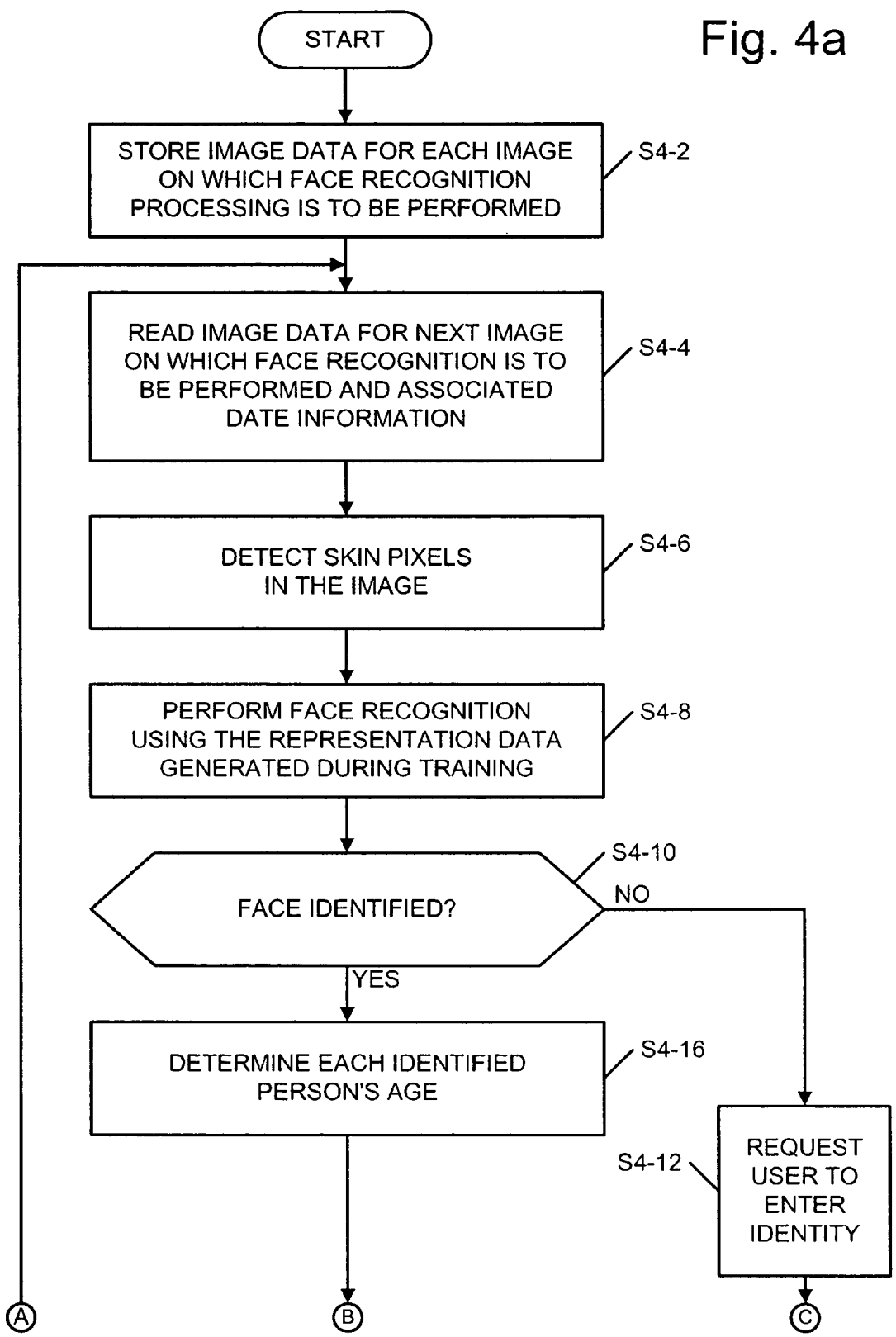

AGE-BASED FACE RECOGNITION

The application claims the right of priority under 35 U.S.C. § 119 based on British patent application numbers 0312946.7 and 0312945.9, both filed 5 Jun. 2003, which are hereby incorporated by reference herein in their entirety as if fully set forth herein.

The present invention relates to the field of image processing and, more particularly, to the processing of image data by an image processing apparatus to perform face recognition to identify a face in the image.

Many different types of face recognition system are known. These include, for example, exemplar-based systems (for example as described in "Exemplar-based Face Recognition from Video" by Krueger and Zhou in ECCV 2002 Seventh European Conference on Computer Vision, Proceedings Part IV, pages 732-746), neural network systems (for example as described in "Face Recognition: A Convolutional Neural Network Approach" by Lawrence et al in IEEE Transactions on Neural Networks, Special Issue on Neural Networks and Pattern Recognition, Volume 8, Number 1, pages 98-113, 1997, and "Multilayer Perceptron in Face Recognition" by Oravec available at www.electronicsletters.com, paper Oct. 11, 2001 ISSN 1213-161x) and eigenface systems (for example as described in "Eigenfaces for Recognition" by Turk and Pentland in the Journal of Cognitive Neuroscience, Volume 3, Number 1, page 71-86).

All of these systems use training data, comprising images of each face to be recognised, to train the face recogniser. This training data is processed to generate representation data for the face recogniser comprising data which characterises each face to be recognised by the system.

A problem arises, however, because people's faces change but the face recognition apparatus must perform face recognition using representation data generated beforehand during training.

The present invention has been made with this in mind.

According to the present invention, there is provided a face recognition apparatus comprising a face recogniser operable to process image data to identify a subject's face therein in accordance with representation data characterising the face of the subject and a representation data tester operable to determine when the representation data is too out of date to be sufficiently reliable to generate accurate face recognition results for the subject.

These features provide the advantage that the user can be alerted when the stored representation data may not allow accurate face recognition results, allowing the user to input more recent training images of the subject to re-train the face recogniser.

The representation data tester may be arranged to determine if the representation data is too out-of-date in dependence upon first and second date information. The first date information comprises information stored for the representation data representing the age of the subject person as characterised by the representation data. The first date information may comprise, for example, any of:
(i) one or more dates representative of the date or dates on which the training images used to generate the representation data were recorded;
(ii) one or more ages or age ranges representative of the age of the subject person at the time(s) when the training images used to generate the representation data were recorded;
(iii) the date that the apparatus was operated to train the face recogniser to generate the representation data (although this type of date information may lead to less accurate results than information of type (i) or type (ii) if there is a large time gap between the date of recording the training images and the date of training the face recogniser).

The second time information may comprise one or more of:
(i) the date on which the image was recorded on which face recognition processing is to be performed using the representation data;
(ii) the age of the subject person when the image was recorded on which face recognition processing is to be performed using the representation data;
(iii) the date that the apparatus is operated to perform face recognition processing (although, again, this type of date information may lead to less accurate results than information of type (i) or type (ii) if there is a large time gap between the date of recording the image and the date of processing the image to perform face recognition).

Preferably, the representation data tester is operable to test the representation data in dependence upon the age gap defined by the first and second date information and also in dependence upon the actual age of the subject person represented by the representation data. In this way, the representation data tester can take account of the fact that the appearance of a person changes at different rates depending upon their age.

The present invention also provides a computer program product, embodied for example as a storage medium carrying instructions or as a signal carrying instructions, comprising instructions for causing a programmable processing apparatus to become configured as an apparatus as set out above.

According to the present invention, there is also provided a face recognition apparatus comprising a face recogniser operable to process image data to identify a face therein in accordance with representation data, a representation data generator operable to generate representation data for the face recogniser comprising respective representation data characterising a face of the subject at each of a plurality of different ages, and a representation data selector operable to select representation data for use by the face recogniser in face recognition processing in dependence upon the recording date of the image to be processed.

These features provide the advantage that different representation data can be selected for use by the face recogniser enabling the representation data likely to produce the most accurate result for a given input image to be selected.

Selection of the representation data may be made by storing at least one respective date for the representation data available for selection, calculating the difference between each date and the recording date of the input image on which face recognition processing is to be performed, and selecting the representation data having the closest date to that of the input image.

Preferably, the apparatus is operable to determine the recording date of each input image by reading information from the image data. In this way, input of information by a user is unnecessary.

The present invention also provides a computer program product, embodied for example as a storage medium carrying instructions or as a signal carrying instructions, comprising instructions for causing a programmable processing apparatus to become configured as an apparatus as set out above.

Embodiments of the invention will now be described, by way of example only, with reference to the accompanying drawings, in which like reference numbers designate like parts, and in which:

FIG. 1 schematically shows the components of a first embodiment of the invention, together with the notional functional processing units and data stores into which the processing apparatus component may be thought of as being configured when programmed by programming instructions;

Figure 1:
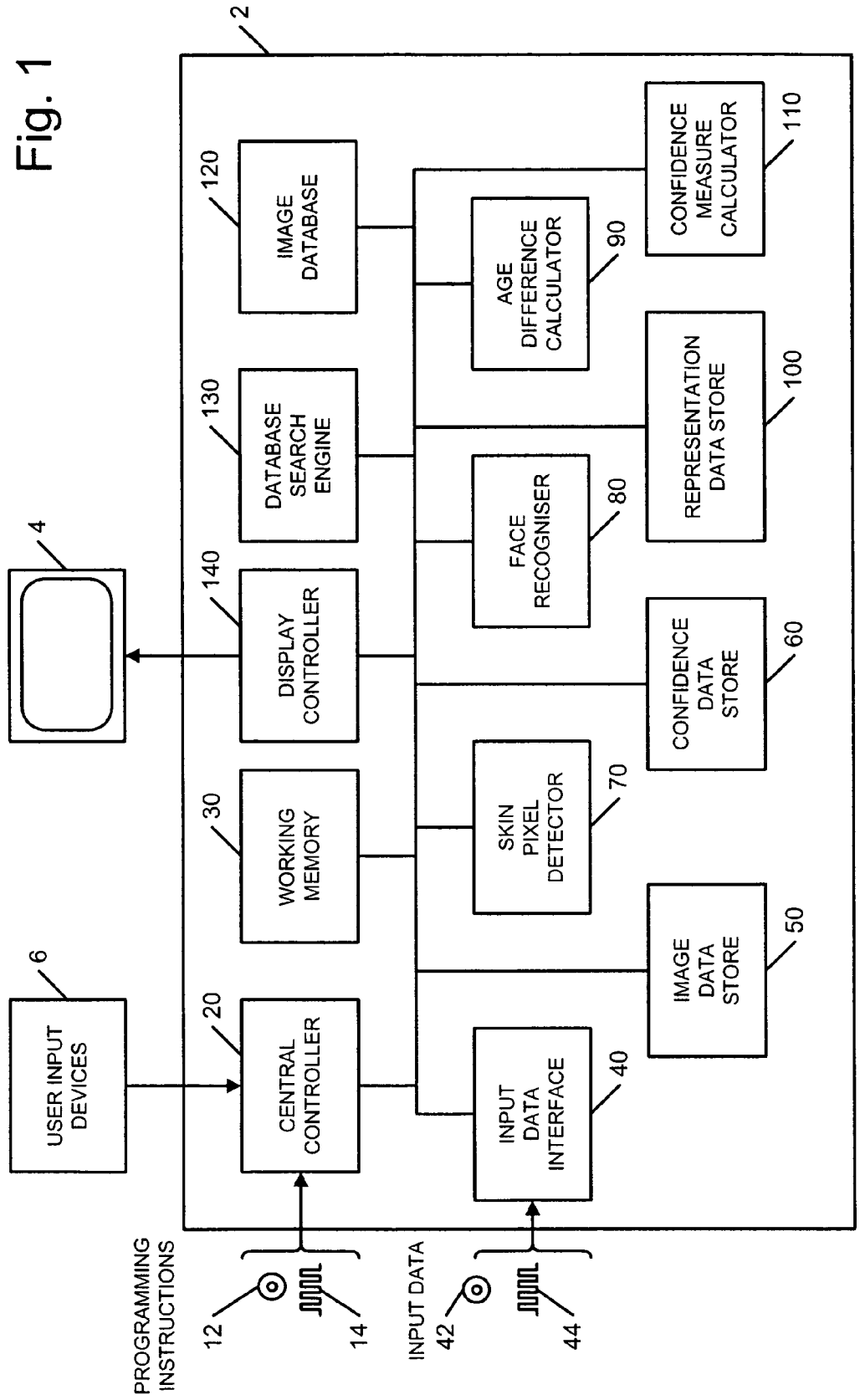
Figure 4B:
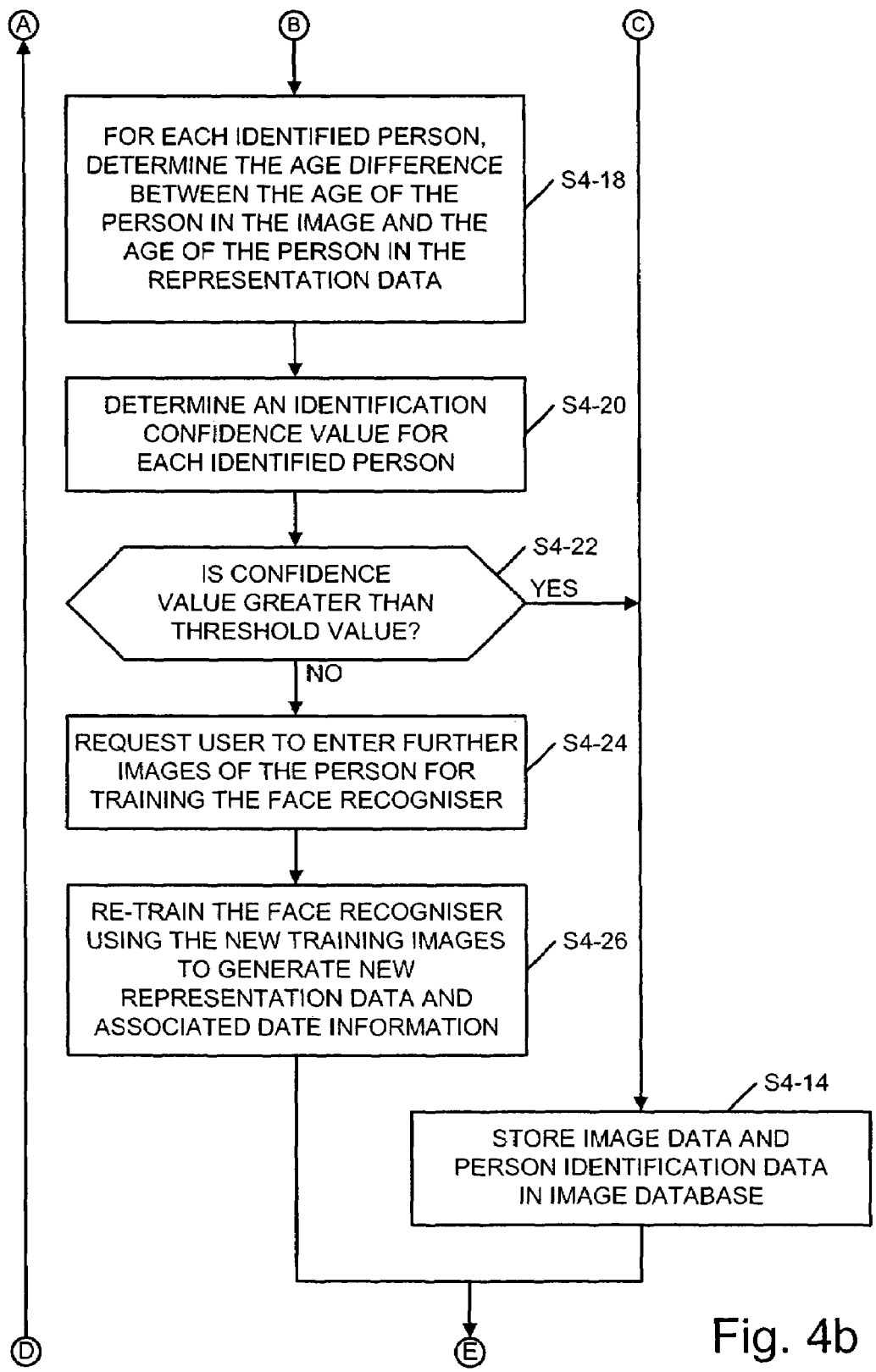
Figure 4C:
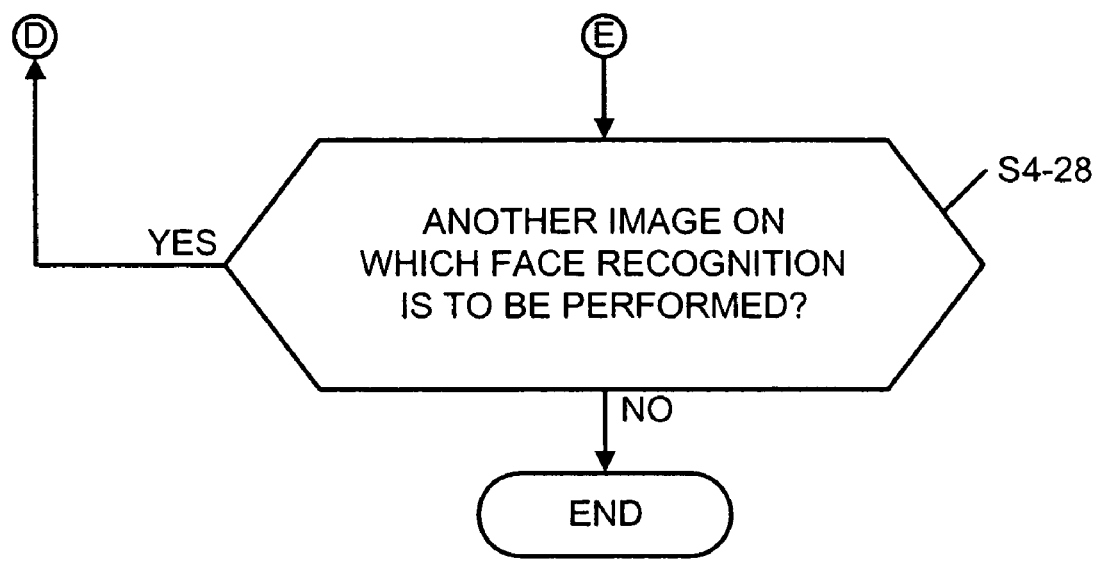
Figure 5A:
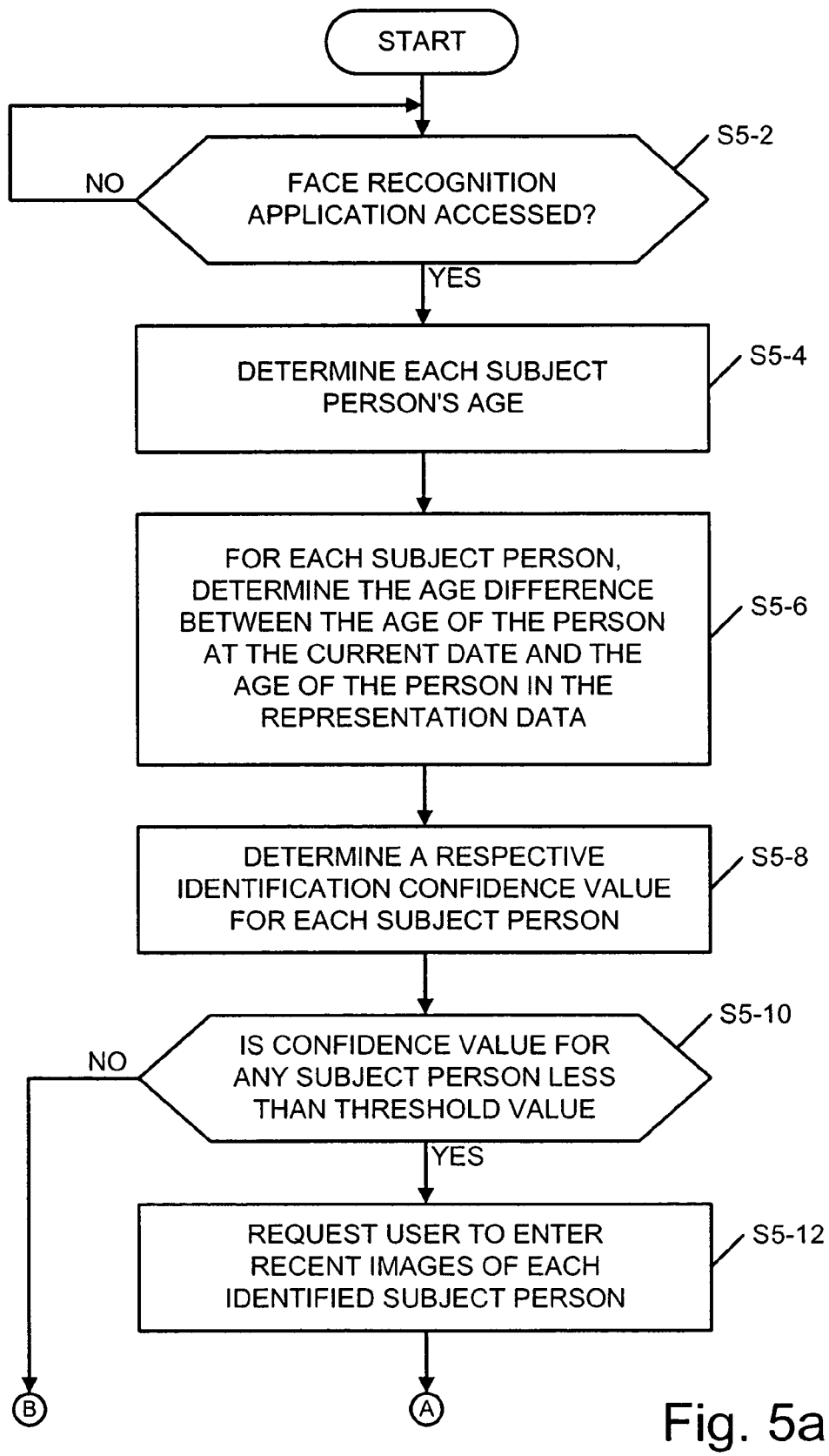
Figure 5B:
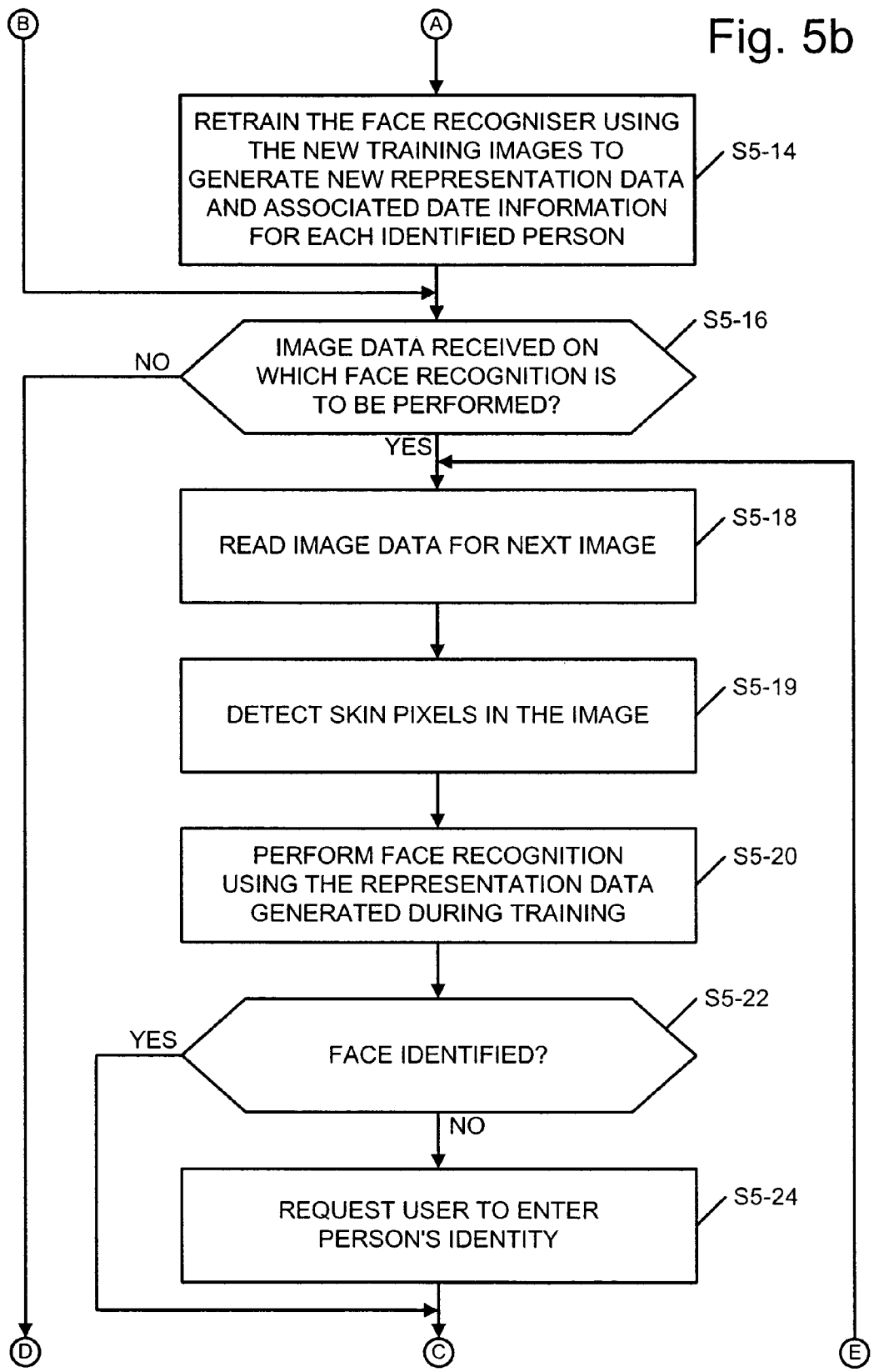
Figure 5C:
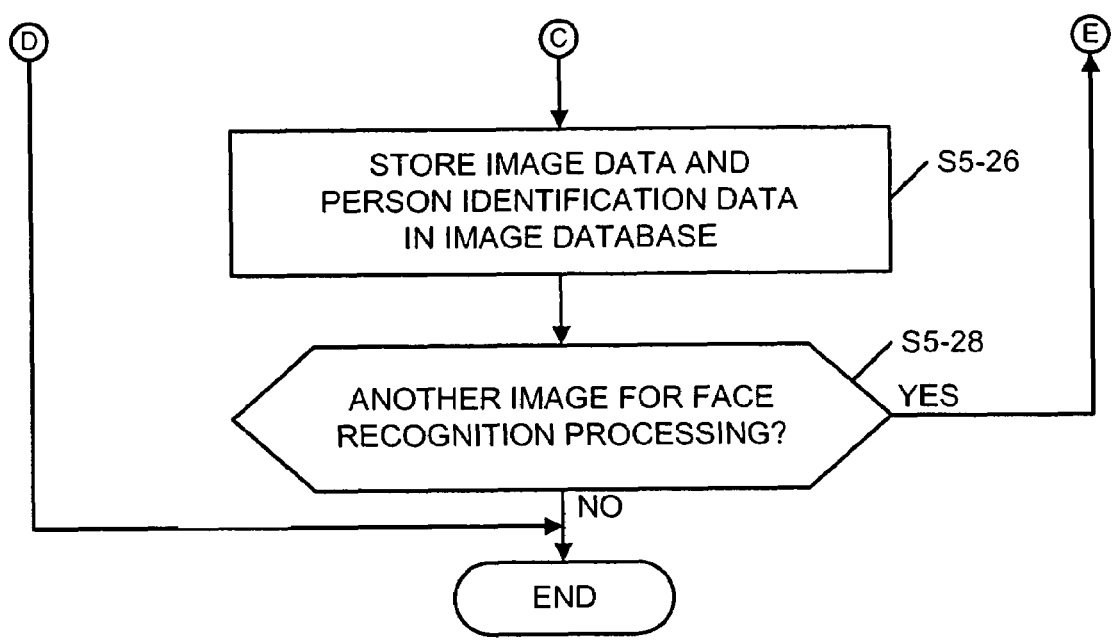
Figure 6A:
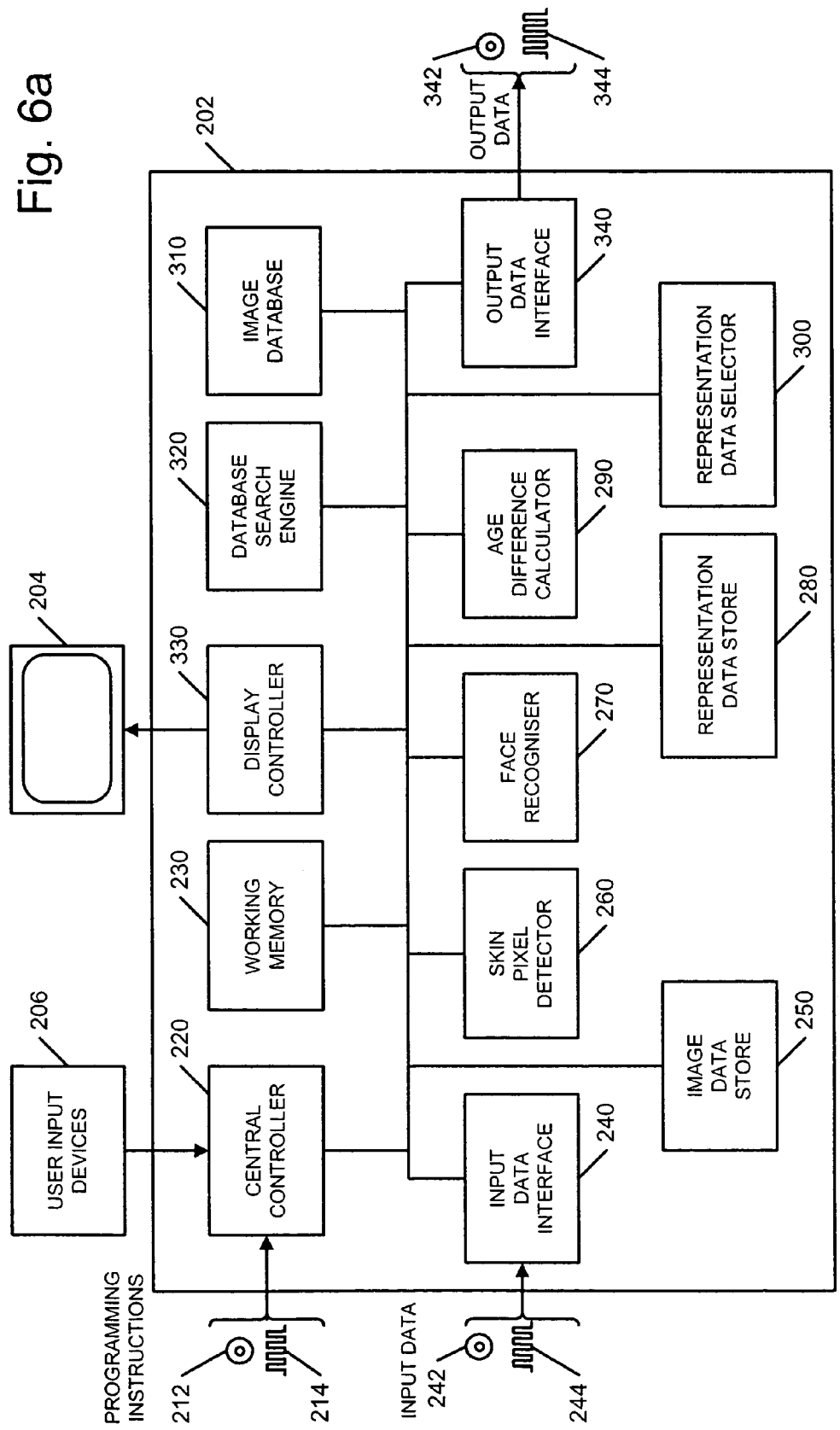
Figure 6B:
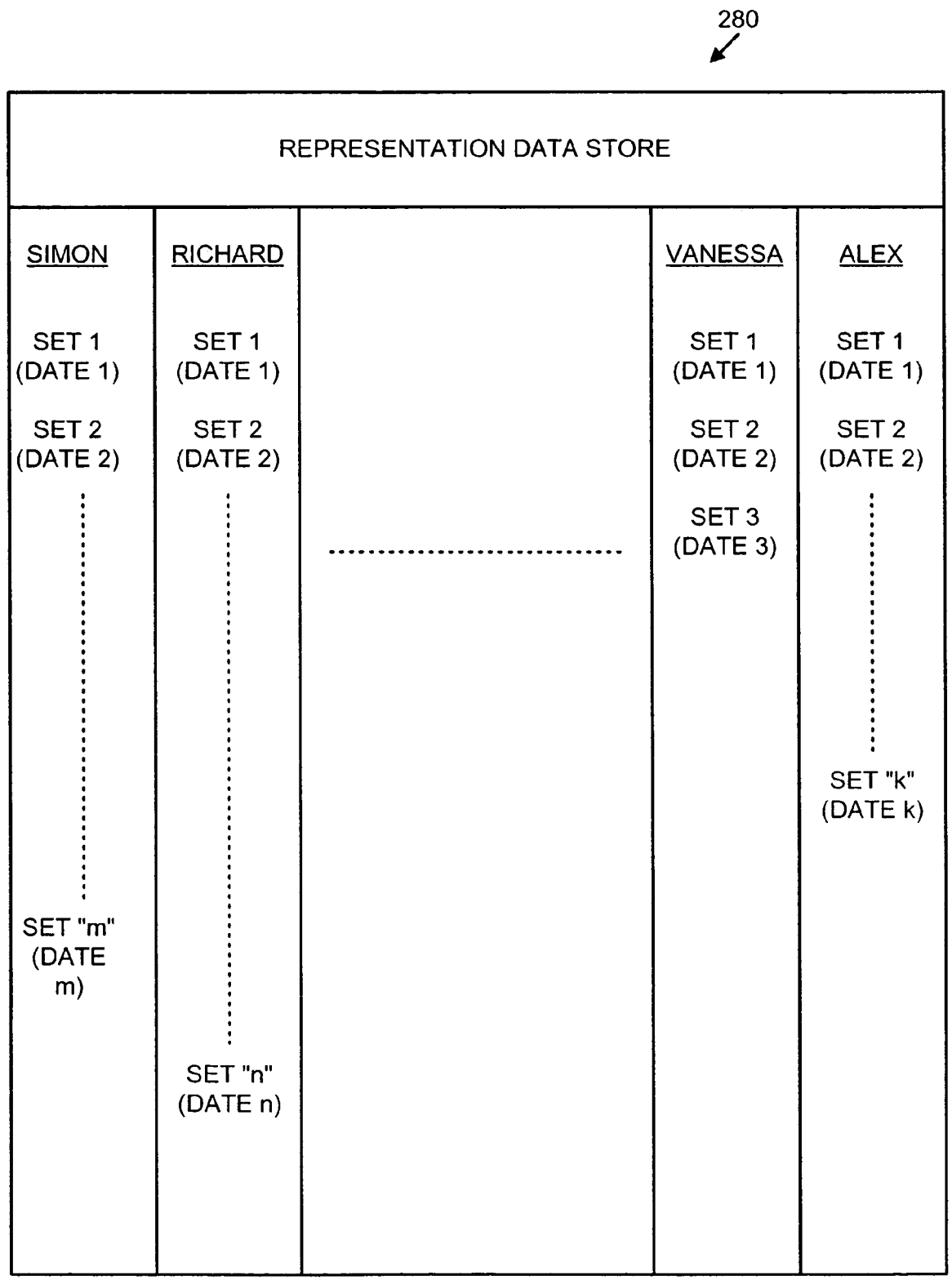

FIG. 4, comprising FIGS. 4a, 4b and 4c, shows the processing operations performed by the apparatus of FIG. 1 during face recognition processing of image data in a first embodiment;

FIG. 5, comprising FIGS. 5a, 5b and 5c, shows the processing operations performed by the apparatus of FIG. 1 after training of the face recogniser in a second embodiment;

FIG. 6 comprises FIGS. 6a and 6b. FIG. 6a schematically shows the components of a third embodiment of the invention, together with the notional functional processing units and data stores into which the processing apparatus component may be thought of as being configured when programmed by programming instructions.

Figure 7:
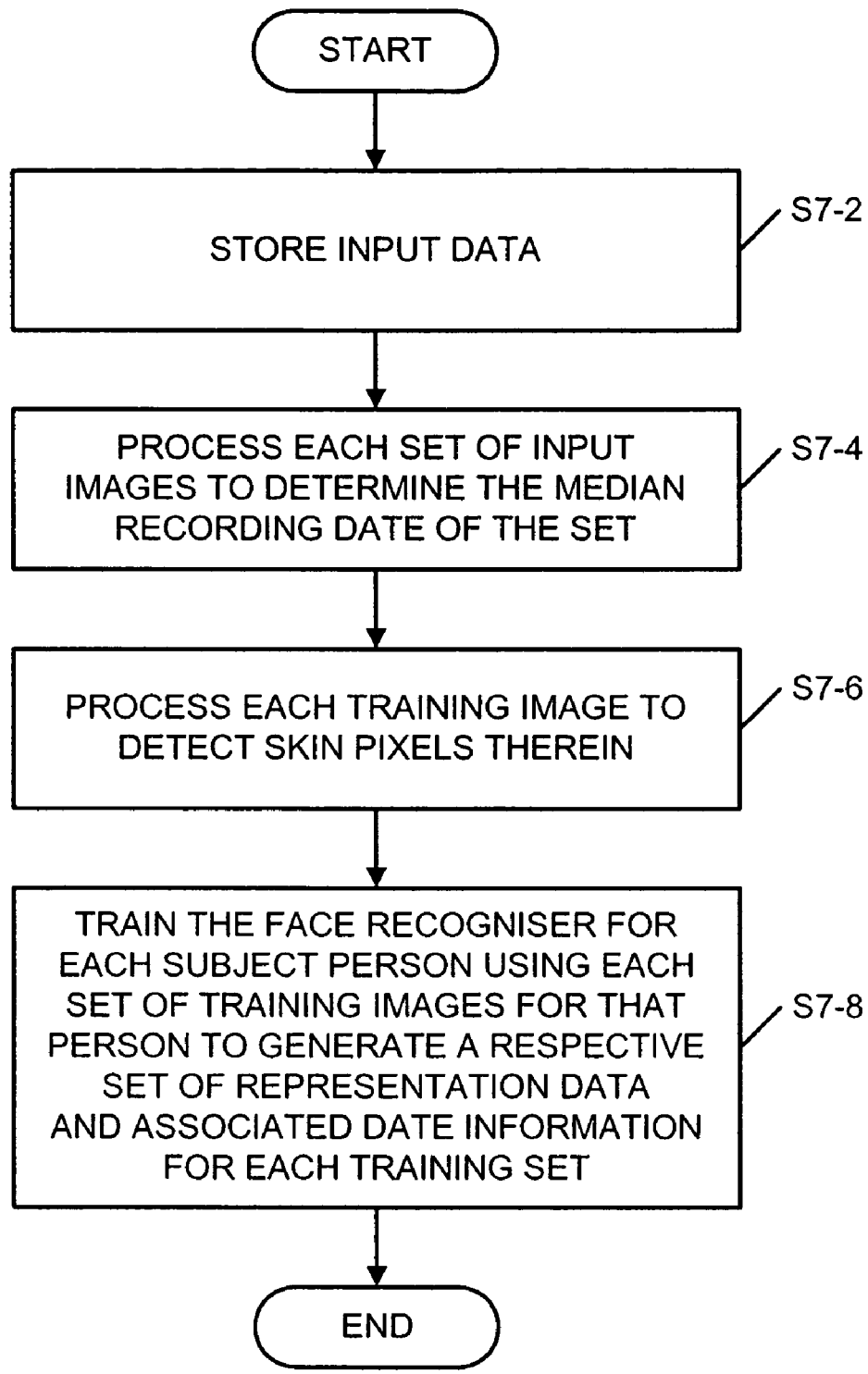
Figure 8A:
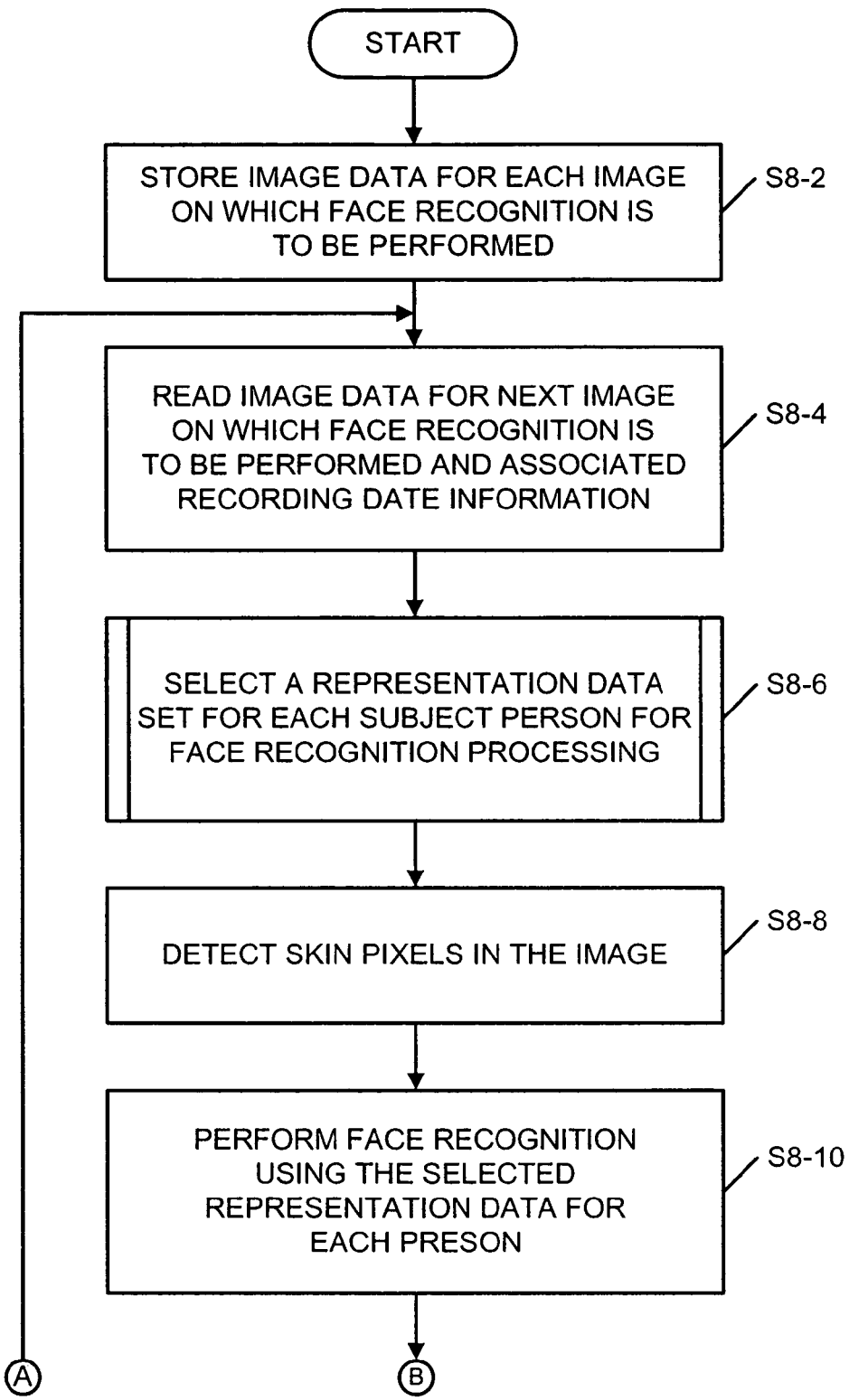
Figure 8B:
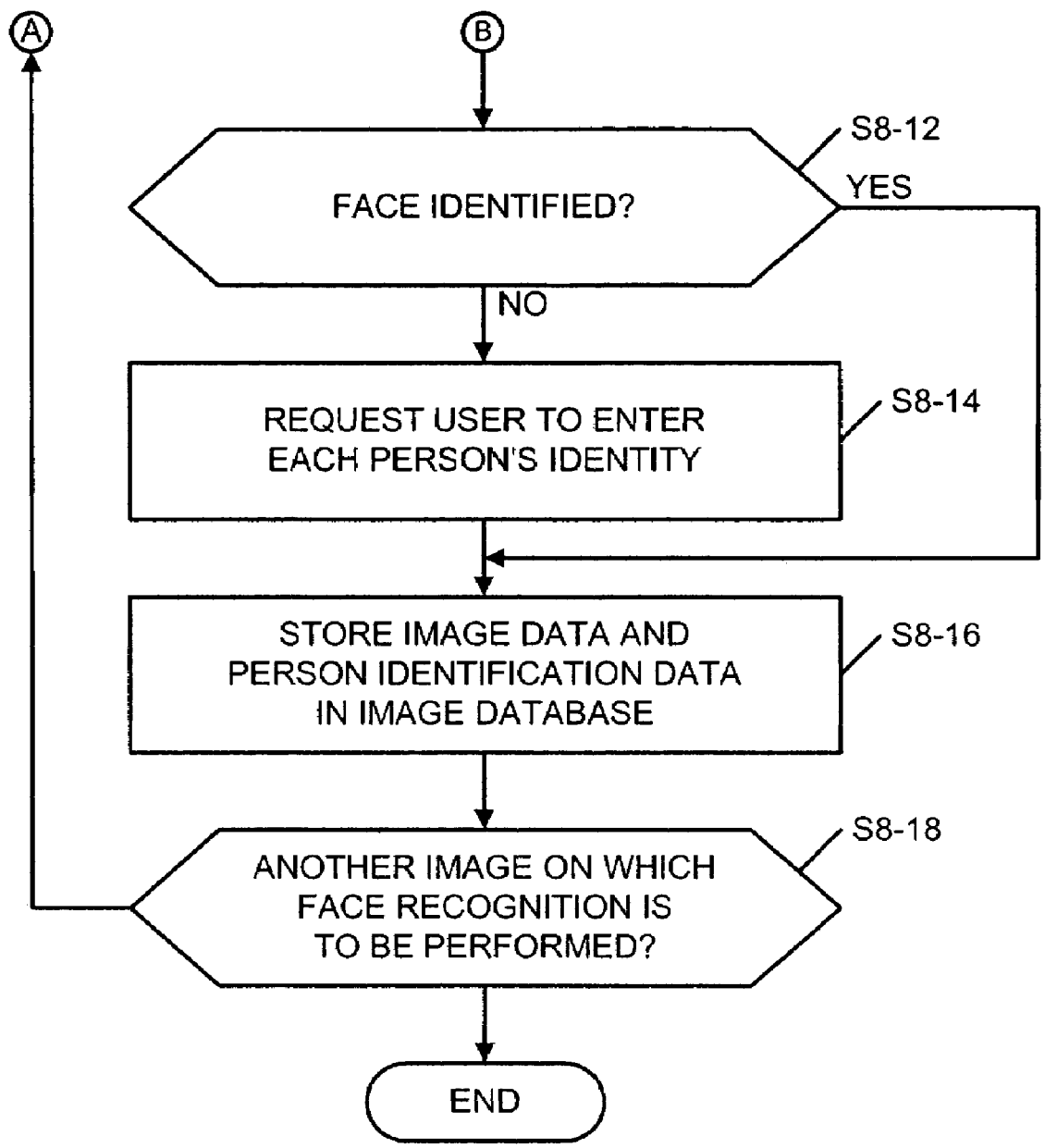
Figure 9:
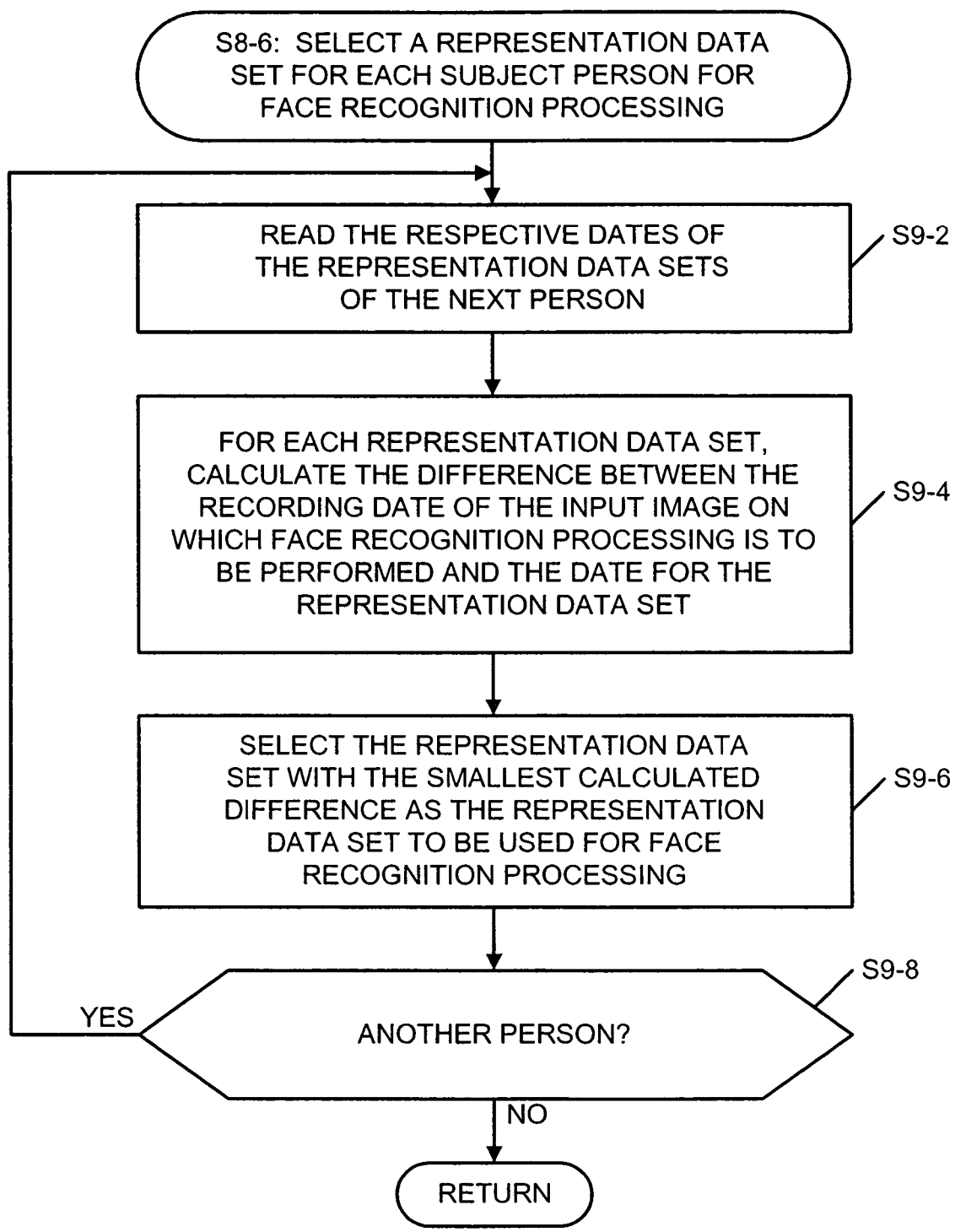
Figure 10:
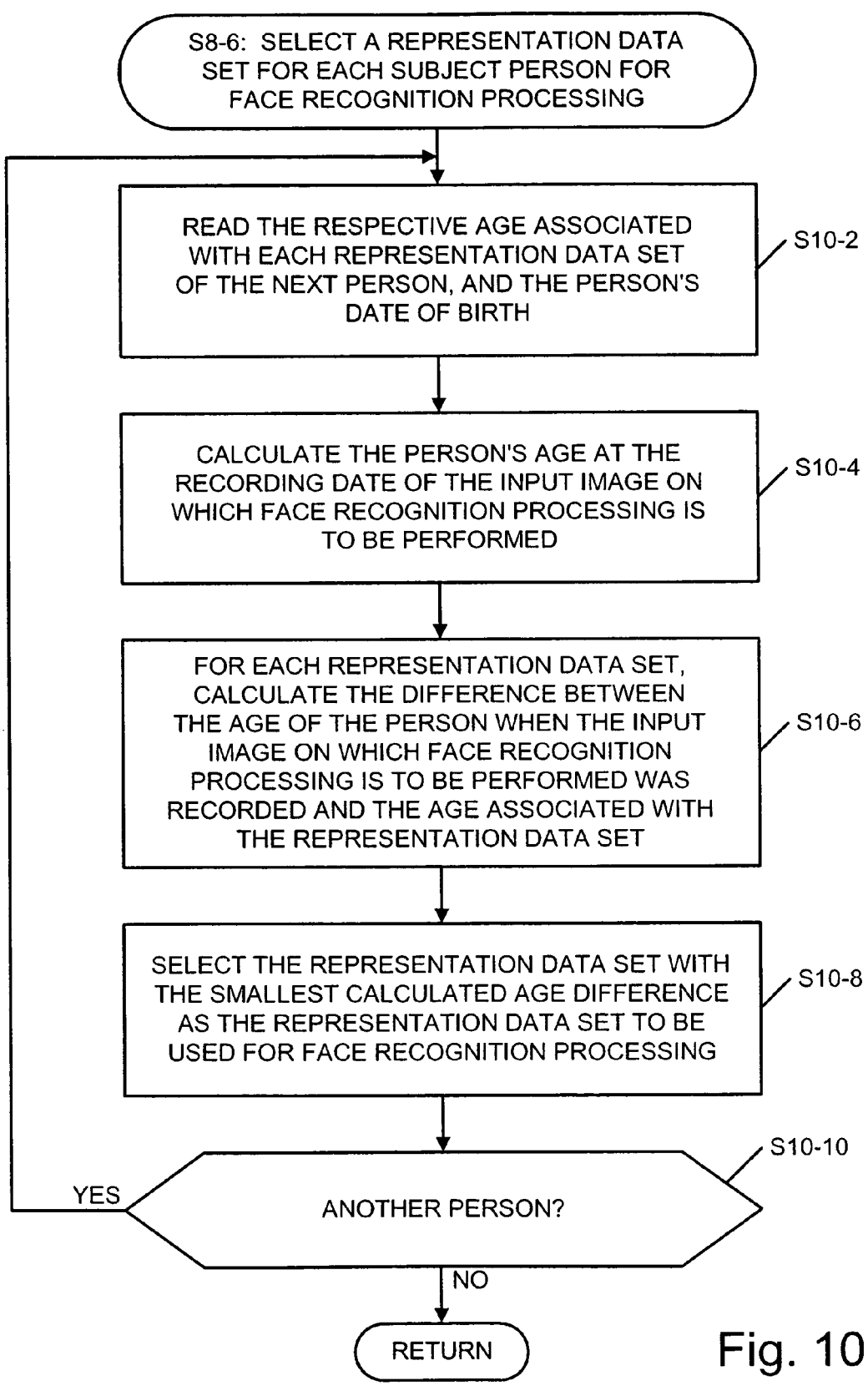

FIG. 6b schematically shows the configuration of the representation data store of FIG. 6a;

FIG. 7 shows the processing operations performed to train the face recogniser in the processing apparatus of FIGS. 6a and 6b;

FIG. 8, comprising FIGS. 8a and 8b, shows the processing operations performed by the apparatus of FIGS. 6a and 6b during face recognition processing of image data;

FIG. 9 shows the processing operations performed in the third embodiment at step S8-6 in FIG. 8; and FIG. 10 shows the processing operations performed in an alternative embodiment at step S8-6 in FIG. 8.

FIRST EMBODIMENT

Referring to FIG. 1, an embodiment of the invention comprises a programmable processing apparatus 2, such as a personal computer, containing, in a conventional manner, one or more processors, memories, graphics cards etc., together with a display device 4 and user input devices 6, such as a keyboard, mouse etc.

The processing apparatus 2 is programmed to operate in accordance with programming instructions input, for example, as data stored on a data storage medium 12 (such as an optical CD ROM, semiconductor ROM, or magnetic recording medium, etc.), and/or as a signal 14 (for example an electrical or optical signal input to the processing apparatus 2, for example from a remote database, by transmission over a communication network such as the Internet or by transmission through the atmosphere), and/or entered by a user via a user input device 6 such as a keyboard.

As will be described in detail below, the programming instructions comprise instructions to program the processing apparatus 2 to become configured to train a face recogniser using images of a person's face to generate representation data for the face recogniser characterising the face in the training images. Date information (in the form of an age in this embodiment) is stored for the representation data defining an age representative of the age of the person at the time of recording the training images used to generate the representation data and therefore representing the age of the person as represented in the representation data. This training is repeated for the faces of different people to generate respective representation data and associated age data for each person. In this way, the trained face recogniser is operable to process input images using the generated representation data to recognise different faces in the input images. Processing apparatus 2 is configured to store confidence data defining how the reliability of the result of face recognition processing by the trained face recogniser is likely to vary as a function of the age difference between the age of a subject person when an image upon which face recognition processing is to be performed was recorded and the age of the subject person as represented by the representation data for that person. Processing apparatus 2 is programmed to check the representation data for each person in accordance with the age information stored therefor and the confidence data to determine whether face recognition performed using the confidence data is likely to be accurate. If any representation data is deemed unlikely to be reliable for face recognition processing, then the user is warned so that new training images can be input and new representation data generated that is likely to produce more accurate face recognition results. Each input image processed by the trained face recogniser is stored in an image database together with data defining the name of each person's face recognised in the image. The database can then be searched in accordance with a person's name to retrieve images of that person.

When programmed by the programming instructions, the processing apparatus 2 can be thought of as being configured as a number of functional units for performing processing operations and a number of data stores configured to store data. Examples of such functional units and data stores together with their interconnections are shown in FIG. 1. The functional units, data stores and interconnections illustrated in FIG. 1 are, however, notional, and are shown for illustration purposes only to assist understanding; as will be appreciated by the skilled person, they do not necessarily represent the units, data stores and connections into which the processors, memories, etc. of the processing apparatus 2 actually become configured.

Referring to the functional units shown in FIG. 1, central controller 20 is arranged to process inputs from the user input devices 6, and also to provide control and processing for the other functional units. Working memory 30 is provided for use by central controller 20 and the other functional units.

Input data interface 40 is arranged to receive, and write to memory, image data defining a plurality of images for training the face recogniser, data defining the name and date of birth of each person in the training images, and confidence data for use in determining whether the representation data generated for the face recogniser during training is likely to be reliable for face recognition processing.

For each person for which the face recogniser is to be trained to perform face recognition, the training images comprise a plurality of images showing different views of the face of the person.

In this embodiment, the confidence data defines the following equations for calculating an identification confidence value C(a, dt):

$$\text{For } dt = 0 \quad C(a, 0) = 1 - \frac{K}{1 + a/T} \tag{1}$$

$$\text{For } dt < -a \quad C(a, dt) = 0 \tag{2}$$

$$\text{For} -a < dt < 0 \quad C(a, dt) = C(a, 0) \times \left[1 - \frac{dt^2}{a^2}\right] \quad (3)$$

$$\text{For } 0 < dt \quad C(a, dt) = C(a, 0) \times e^{-dt^2/a^2 D^2} \quad (4)$$

where:
- a is the age in years of the person as represented in the representation data;
- dt is an age difference for the person, comprising the difference between the age of the person when an image upon which face recognition is to be performed was recorded and the age of the person ("a") in the representation data;
- dt<0 if the age of the person when the image upon which face recognition is to be performed was recorded is less than the age of the person as represented in the representation data;
- dt>0 if the age of the person when the image upon which face recognition is to be performed was recorded is greater than the age of the person as represented in the representation data;
- K is a constant, set to 0.1 in this embodiment;
- T is a constant, set to 0.5 in this embodiment;
- D is a constant, set to 1 year in this embodiment.

As will explained in more detail below, equations (1) to (4) above are used to test the representation data for each person by calculating an identification confidence value for each person at different times (that is, for different values of dt).

Figure 2:
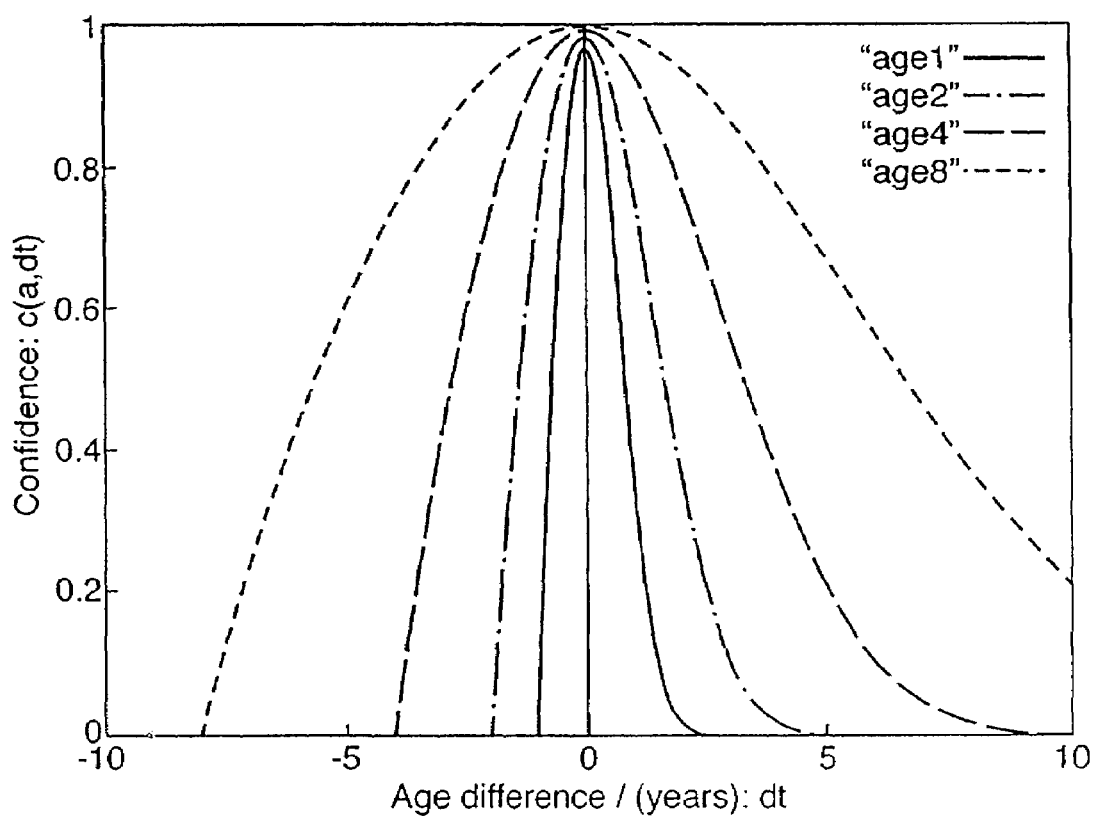
FIG. 2 illustrates how face recognition confidence values vary with age difference for different respective ages in accordance with the confidence data stored in the confidence data store of the apparatus of FIG. 1.

FIG. 2 shows graphs plotted using equations (1) to (4) for respective ages of a=1, a=2, a=4 and a=8, to illustrate how the confidence value C(a, dt) varies as dt varies.

It will be seen from equations (1) to (4) and FIG. 2 that C(a, dt) has the following properties:
- C(a, dt) is a maximum when dt=0 for all a;
- C(a, dt) decreases as |dt| increases for all a;
- C(a, 0)≧C(b, 0) if a≧b (because a person becomes more distinctive as they grow older).

Input data interface 40 is further arranged to receive, and write to memory, input image data defining each image on which face recognition is to be performed by the trained face recogniser.

In this embodiment, each input image (whether a training image or an image on which face recognition processing is to be performed) contains pixel data on which has been overlaid the recording date of the input image (this information being provided in a conventional way by recording each input image with a camera having a so-called "databack" which overlays the recording date on the image).

The input data may be input to processing apparatus 2 as data stored on a storage medium 42, and/or as data carried by a signal 44.

Image data store 50 is configured to store the input image data defining the images to be used for training the face recogniser, and the images on which face recognition is to be performed by the trained face recogniser.

Confidence data store 60 is configured to store the confidence data input to processing apparatus 2.

Skin pixel detector 70 is operable to process image data from image data store 50 to detect areas within each image which represent human skin.

Face recogniser 80 is operable to use the training image data from image data store 50 to generate representation data characterising each person's face in the training data. The generation of representation data is referred to as training to generate a trained face recogniser 80. More particularly, for each person, the training images of that person are used to generate a respective representation data set characterising the person's face.

The trained face recogniser 80 is operable to process image data from image data store 50 using the representation data generated during training to determine whether the image contains a face defined by the representation data and, if it does, to identify which of the faces the image contains.

The processing performed to train face recogniser 80 to generate representation data, the content of the representation data itself, and the processing performed by the trained face recogniser 80 to recognise a face in an input image will vary depending upon the type of face recogniser 80. In subsequent description, examples of the processing and representation data will be given for an exemplar-based face recogniser 80, a neural network face recogniser 80 and an eigenface face recogniser 80. However, face recogniser 80 is not restricted to these types and other types of face recogniser 80 are possible.

Age difference calculator 90 is operable to read the pixel data of each image stored in image data store 50, to identify the pixels on which recording date information is overlaid and to determine therefrom the image recording date. Age difference calculator 90 is further operable to calculate the age of a subject person at the time when an input image was recorded by subtracting the date of birth of the subject person from the image recording date, and to process the calculated ages for a particular person when training images were recorded to calculate the median age of the person shown in the training images (this median age then being stored as date data for the representation data generated from the training images to define the age of the person as characterised by the representation data). In addition, age difference calculator 90 is operable to calculate the difference in age between the subject person's age at the input image recording date and the age of the subject person as represented in representation data of the face recogniser 80.

Representation data store 100 is configured to store data for each person that the face recogniser 80 has been trained to recognise comprising representation data characterising the face of the person, the median age of the person when the training images used to generate the representation data were recorded, the date of birth of the person, and the name of the person.

Confidence measure calculator 110 is operable to calculate a confidence measure for representation data stored in representation data store 100 using the date information stored for the representation data (comprising, in this embodiment, the median age of the person when the training images used to generate the representation data were recorded), the confidence data stored in confidence data store 60 and an age difference calculated by age difference calculator 90. More particularly, confidence measure calculator 110 is operable to evaluate equations (1) to (4) above using the age information stored for the representation data as an input "a" to the equations and the age difference calculated by age difference calculator 90 as an input "dt" to the equations.

Image database 120 is configured to store image data from image data store 50 which has been processed by face recogniser 80. Image database 120 is also configured to store name data linked with each image identifying the people whose faces have been recognised in the image.

Database search engine 130 is operable to search the data in the image database 120 in accordance with a name input by a user using a user input device 6 such as a keyboard, to identify each image in the image database 120 which contains the face of the person with the input name. Database search engine 130 is further operable to enable a user to select one or more of the identified images from image database 120 and to display the selected image(s) on display device 4.

Display controller 140, under the control of central controller 20, is operable to control display device 4 to display image data received as input image data, and to display image data retrieved from image database 120.

Figure 3:
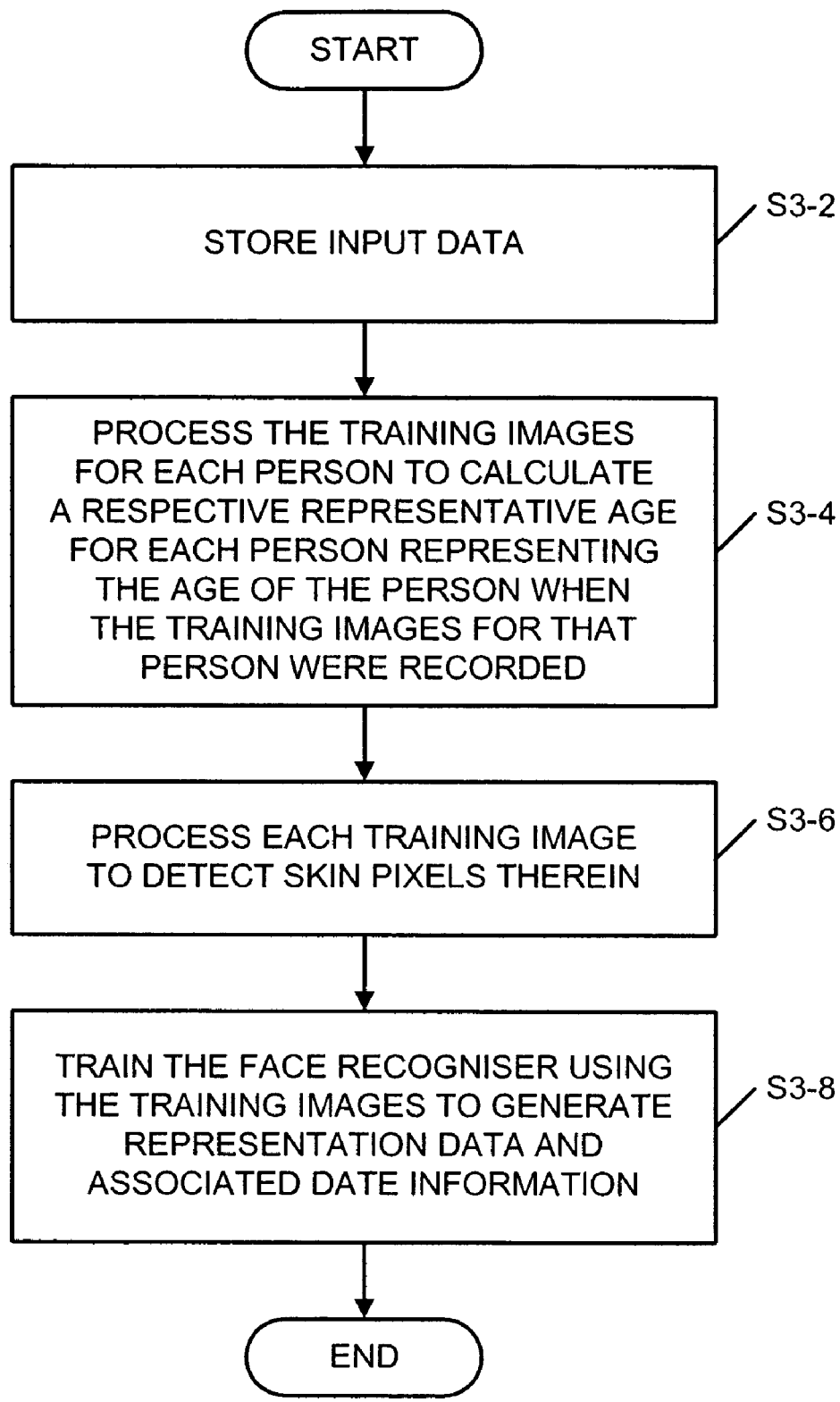
FIG. 3 shows the processing operations performed to train the face recogniser in the processing apparatus of FIG. 1.

FIG. 3 shows the processing operations performed by processing apparatus 2 to train face recogniser 80 in this embodiment.

Referring to FIG. 3, at step S3-2, input data interface 40 stores input data in image data store 50 comprising a plurality of images of each person that the face recogniser 80 is to be trained to recognise. Each image may comprise a frame of video data or a "still" image. In this embodiment, each input image contains pixel data on which has been overlayed the recording date of the input image (this information being provided in a conventional way by recording each input image with a camera having a so-called "databack" which overlays the recording date on the image). Input data interface 40 also stores confidence data in confidence data store 60 defining equations (1) to (4) above, and data defining the name and date of birth of each person shown in the training images in representation data store 100.

At step S3-4, age difference calculator 90 processes the training images stored at step S3-2 for each respective person to calculate a representative age for the person when the training images were recorded. More particularly, for each person, age difference calculator 90 reads the pixel data of each training image stored at step S3-2 to determine the respective recording dates of the training images, calculates the age of the person when each training image was recorded by subtracting the person's date of birth from each determined image recording date, and calculates the median age of the determined ages. In this way, a respective age is calculated for the training images of each person representative of the age of the person when the training images were recorded. As will be explained below, each respective age is stored as date data for the corresponding representation data generated for the face recogniser 80 using the training images.

At step S3-6, skin pixel detector 70 processes each training image stored at step S3-2 to detect skin pixels in the image. This processing is performed in a conventional way, for example as described in JP-A-11194051 or EP-A-1211638. The result of this processing is a respective skin pixel image (comprising the skin coloured pixels extracted from the input image data) for the face in each input image.

At step S3-8, face recogniser 80 is trained using the skin pixel image data generated at step S3-6 to generate representation data for subsequent use in face recognition processing. More particularly, face recogniser 80 is trained using the skin pixel images for each person to generate a respective representation data set for each person.

The processing performed at step S3-8 and the representation data generated by the processing is dependent upon the type of the face recogniser 80.

For example, in an exemplar-based face recogniser 80, the processing at step S3-8 comprises, for the skin pixel images of each person generated at step S3-6, storing image data defining each skin pixel image and data defining the associated median age (calculated at step S3-4) to define a respective representation data set for the face recogniser 80. In this way, a respective set of exemplars and associated age data is stored in representation data store 100 for each person.

In a neural network face recogniser 80, the processing at step S3-8 comprises, for the skin pixel images of each person generated at step S3-6, determining the synaptic weights for the links between the neurons in the neural network. This is performed, for example, using a back propagation technique to generate synaptic weights which give the same output value(s) from the neural network for each input skin pixel image for the person. The representation data stored in representation data store 100 therefore comprises a respective representation data set for each person to be recognised, comprising a set of synaptic weights, the associated output value(s) generated by the neural network, and the median age for the person calculated at step S3-4. Suitable processing for training a neural network face recogniser at step S3-8 is described, for example, in "Face Recognition: A Convolutional Neural Network Approach" by Lawrence et al in IEEE Transactions on Neural Networks, Special Issue on Neural Networks and Pattern Recognition, Volume 8, Number 1, pages 98-113, 1997, and "Multilayer Perceptron in Face Recognition" by Oravec available at www.electronicsletters.com, paper Oct. 11, 2001 ISSN 1213-161×.

For an eigenface face recogniser 80, the processing at step S3-8 involves, for the skin pixel images of each person generated at step S3-6, calculating the "eigenfaces" which characterise the variation in the skin pixel images, these eigenfaces defining a multi-dimensional "face space". This is performed in a conventional way, for example as described in "Eigenfaces for Recognition" by Turk and Pentland in the Journal of Cognitive Neuroscience, Volume 3, Number 1, page 71-86). The processing comprises calculating an average face (represented by a vector) from the faces in the skin pixel training images for the person, calculating a respective difference vector for each skin pixel image for the person defining the difference between the skin pixel image and the average face, arranging the difference vectors in a "q" by "q" matrix (where q is the total number of skin pixel images for the person), calculating the eigenvectors and eigenvalues of the matrix, selecting the eigenvectors with the largest associated eigenvalues, and linearly combining the skin pixel images for the person in accordance with the selected eigenvectors to define a set of "eigenfaces" which define a "face space". A class vector in the "face space" characterising the face of the person in the skin pixel images is then calculated by transforming each skin pixel image for the person into its eigenface components and calculating a vector that describes the contribution of each eigenface representing the face. An average of the calculated vectors is then calculated to define a class vector for the face in the set. In effect, the class vector for a person's face defines a region of face space characterising the face. A threshold value is then set defining a distance within the "face space" from the calculated class vector, this threshold distance defining a distance within which a vector calculated for a face to be recognised must lie to be identified as a face in that class (that is, to recognise the person as the person defined by that class vector). The processing described above is repeated for the skin pixel images of each person. Accordingly, in an eigenface face recogniser 80, a respective set of representation data is generated for each person, with each set comprising data defining eigenfaces, a class vector (characterising the face of the person), and a threshold distance.

FIGS. 4*a*, 4*b* and 4*c* show the processing operations performed by processing apparatus 2 containing the trained face recogniser 80 to perform face recognition processing on input image data in this embodiment.

It should be noted that a time delay may occur between the processing operations of FIG. 3 and the processing operations of FIG. 4 because the user may delay inputting image data upon which face recognition is to be performed.

Referring to FIG. 4, at step S4-2, input data interface 40 stores image data input to processing apparatus 2 in image data store 50 as image data on which face recognition is to be performed by the trained face recogniser 80. It should be noted that each image stored at step S4-2 may comprise a frame of video data or a "still" image. In this embodiment, each image contains information defining its recording date, this information being overlayed on the pixel image data of some of the pixels in a conventional way.

At step S4-4, image data for the next image to be processed is read from image data store 50 (this being image data for the first image the first time step S4-4 is performed), and the information identifying the recording date of the image is identified in the pixel data and read.

At step S4-6, skin pixel detector 70 detects skin pixels in the image data read at step S4-4 using processing the same as that performed at step S3-6, to generate a respective skin pixel image for each face in the input image. Accordingly, if there is more than one face in the input image, then more than one skin pixel image is generated at step S4-6.

At step S4-8, face recogniser 80 processes each skin pixel image generated at step S4-6 to perform face recognition processing using the representation data for each person stored in representation data store 100.

As with step S3-8, the processing performed at step S4-8 will be dependent upon the type of the face recogniser 80.

For example, for an exemplar-based face recogniser 80, the processing at step S4-8, comprises, for the representation data of each person, comparing the image data for each skin pixel image generated at step S4-6 with each exemplar image in the representation data using conventional image comparison techniques. Such comparison techniques may comprise, for example, one or more of a pixel-by-pixel intensity value comparison of the image data, an adaptive least squares correlation technique (for example as described in "Adaptive Least Squares Correlation: A Powerful Image Matching Technique" by Gruen in Photogrammatry Remote Sensing and Cartography, 1985, pages 175-187), and detection of edges or other salient features in each image and processing to determine whether the detected edges/features align. In this way, for each skin pixel image generated at step S4-6, a respective match score is calculated for each exemplar in the representation data for the person defining the accuracy of the match between the exemplar and the skin pixel image. This processing is repeated for the representation data of each person.

For a neural network face recogniser 80, the processing performed at step S4-8 for the representation data of each person comprises processing the image data of each skin pixel image generated at step S4-6 using the neural network and the synaptic weights defined by the representation data for the person to generate one or more output values.

For an eigenface face recogniser 80, processing may be performed at step S4-8 for the representation data of each person for example as described in "Eigenfaces for Recognition" by Turk and Pentland in the Journal of Cognitive Neuroscience, Volume 3, Number 1, page 71-86. For the representation data of each person, this processing effectively comprises, for each skin pixel image generated at step S4-6, projecting the skin pixel image into the face space defined by the eigenfaces in the representation data, and then comparing its position in face space with the position of the face data for the person (defined by the class vector in the representation data). To do this, for each skin pixel image, the image data generated at step S4-6 is transformed into its eigenface components, a vector is calculated describing the contribution of each eigenface representing the face in the image data, and the respective difference between the calculated vector and the class vector stored in the representation data is calculated (this difference effectively representing a distance in face space). This processing is repeated for the representation data for each person. As a result, the distance in face space between each skin pixel image and the image data of each person is calculated.

At step S4-10 face recogniser 80 determines whether a face has been recognised as a result of the processing at step S4-8.

In an exemplar-based face recogniser 80, the processing at step S4-10 comprises, for each skin pixel image generated at step S4-6, selecting the highest match score calculated at step S4-8 and determining whether the selected match score is above a threshold. In the event that the highest match score is above the threshold, then it is determined that the face of the person to which the matching exemplar relates has been identified in the input image.

For a neural network face recogniser 80, the processing at step S4-10 comprises, for each skin pixel image generated at step S4-6, calculating the difference between the output value(s) of the neural network at step S4-8 and the corresponding output value(s) for each person stored in the representation data to generate difference values for each person. The smallest difference value(s) are then selected and compared with a threshold to determine whether the difference(s) are sufficiently small. If it is determined that the difference(s) are less than the threshold, then it is determined that the face of the person to which the representation data for the smallest difference(s) relates has been recognised in the input image.

For an eigenface face recogniser 80, the processing at step S4-10 comprises, for each skin pixel image generated at step S4-6, selecting the smallest distance value calculated at step S4-8 and determining whether it is within the threshold distance defined in the corresponding representation data (for example as described in "Eigenfaces for Recognition" by Turk and Pentland in the Journal of Cognitive Neuroscience, Volume 3, Number 1, page 71-86). If it is determined that the distance is less than the threshold, then it is determined that the face of the person corresponding to the class vector to which the smallest distance relates has been recognised in the input image.

It should be noted that the processing at step S4-6 may detect the skin pixels from more than one face and that, consequently, the processing at steps S4-8 and S4-10 may recognise more than one face in the input image.

If it is determined at step S4-10 that a face has not been recognised, then processing proceeds to step S4-12, at which the image data read at step S4-4 is displayed on display device 4, together with a message prompting the user to enter data identifying each person appearing therein.

Processing then proceeds to step S4-14, at which the image data read at step S4-4 is stored in image database 120 together with data defining the name of each person who was identified by the user at step S4-12. In this way, image data and name data is stored in image database 120 for subsequent searching and retrieval by database search engine 130.

Referring again to step S4-10, if it is determined that a face has been recognised in the input image, then processing proceeds to step S4-16.

At step S4-16, age difference calculator 90 determines the age of each person identified at step S4-10 by subtracting the date of birth of the identified person (stored in representation data store 100) from the date at which the input image on which face recognition has been performed was recorded (read at step S4-4).

At step S4-18, age difference calculator 90 determines an age difference for each person identified at step S4-10 comprising the difference between the age of the person calculated at step S4-16 and the age of the person defined for the representation data (stored in representation data store 100).

At step S4-20, confidence measure calculator 110 calculates an identification confidence value for each identified person using the confidence data stored in confidence data store 60, the age difference for each identified person calculated at step S4-18 and the age defined in the representation data for each identified person.

More particularly, to calculate the identification confidence value for each identified person, confidence measure calculator 110 evaluates equations (1) to (4) above using the age difference calculated at step S4-18 for that person as an input "dt" to the equations and the age defined in the representation data for that person as an input "a" to the equations.

At step S4-22, confidence measure calculator 110 determines whether the identification confidence value of each person calculated at step S4-20 is above a threshold value which, in this embodiment, is set to 0.85.

If it is determined at step S4-22 that the identification confidence value for a particular person is greater than the threshold value, then processing proceeds to step S4-14 at which the image data read at step S4-4 stored in image database 120 together with data defining the name of that person. In this way, image data and name data is stored in image database 120 for subsequent searching and retrieval by database search engine 130.

On the other hand, if it is determined at step S4-22 that the identification confidence value for a particular person is less than or equal to the threshold value, then processing proceeds to step S4-24, at which the user is requested to enter images for training the face recogniser 80 showing that person at an age close to the age determined at step S4-16.

At step S4-26, the face recogniser 80 is re-trained using the new training images input by the user to generate new representation data and associated age information. The processing performed at step S4-26 to re-train the face recogniser is the same as that performed at step S3-8, and accordingly will not be described again here.

Following the processing at step S4-26 or the processing at step S4-14, processing proceeds to step S4-28.

At step S4-28, a check is carried out to determine whether image data was stored at step S4-2 for another image on which face recognition is to be performed. Steps S4-4 to S4-28 are repeated until face recognition processing has been performed for each input image stored at step S4-2.

SECOND EMBODIMENT

A second embodiment of the present invention will now be described.

The components of the second embodiment are the same as those of the first embodiment shown in FIG. 1 and described above. In addition, the processing operations performed in the second embodiment to train the face recogniser 80 are the same as those in the first embodiment described above with reference to FIG. 3. However, the timing of the operations performed by the age difference calculator 90 and confidence measure calculator 110 are different in the second embodiment compared to the first embodiment.

More particularly, in the first embodiment, age difference calculator 90 operates in response to the identification of a person at step S4-10 to determine the age of each identified person at step S4-16 and to determine the age difference for each identified person at step S4-18. Similarly, in the first embodiment, confidence measure calculator 110 determines an identification confidence value only for each person identified at step S4-10.

On the other hand, as will be explained below, in the second embodiment, age difference calculator 90 and confidence measure calculator 110 are arranged to perform processing for each person for which representation data is stored in representation data store 100 before face recognition processing by face recogniser 80 is performed.

FIGS. 5*a*, 5*b* and 5*c* show the processing operations performed by processing apparatus 2 containing the trained face recogniser 80 in the second embodiment.

Referring to FIG. 5, at step S5-2, a check is made to determine whether the software stored in the processing apparatus 2 defining the face recognition application has been accessed.

When it is determined at step S5-2 that the face recognition application has been accessed, then processing proceeds to step S5-4, at which age difference calculator 90 calculates the age of each person for which representation data is stored in representation data store 100. This processing is performed by subtracting the date of birth of each person (stored in representation data store 100) from the current date (that is, the date on which processing apparatus 2 is operating).

At step S5-6, age difference calculator 90 determines an age difference for each person, comprising the difference between the age of the person calculated at step S5-4 and the age associated with the representation data for that person (previously calculated during training at step S3-4 and stored at step S3-8).

At steps S5-8 to S5-14 processing is performed to calculate an identification confidence value for each person and to retrain the face recogniser 80 using more recent images of each person for which the calculated identification confidence value is less than a predetermined threshold value. The processing operations performed at steps S5-8 to S5-14 are the same as those performed in the first embodiment at steps S4-20 to S4-26, and accordingly will not be described again here.

At steps S5-16 to S5-28, processing is performed to perform face recognition processing on one or more input images using the face recogniser 80 and the representation data therefor generated during initial training at step S3-8 or subsequent re-training at step S5-14. The processing operations performed at steps S5-18 to S5-28 are the same as those performed in the first embodiment at steps S4-4 to S4-14 and S4-28, respectively. Accordingly, these steps will not be described again here.

MODIFICATIONS AND VARIATIONS OF THE FIRST AND SECOND EMBODIMENTS

Many modifications and variations can be made to the embodiments described above within the scope of the claims.

For example, depending upon the type of face recogniser 80, skin pixel detector 70 and the processing operations performed thereby at steps S3-6, S4-6 and S5-19 may be omitted from the embodiments above.

In the embodiments described above, each image stored at step S3-2 is used to train the face recogniser 70 at step S3-8. However, instead, the input images may be processed to select images for each person for training which are sufficiently different from each other and to discard non-selected images so that they are not used in the processing at steps S3-6 and S3-8.

In the embodiments above, the confidence data stored in confidence data store 60 comprises data defining equations (1) to (4) set out above, and confidence measure calculator 110 is arranged to calculate each identification confidence value at steps S4-20 and S5-8 by evaluating the equations using the age difference calculated at step S4-18 or S5-6 and the age associated with the representation data being tested. However, instead, the confidence data stored in confidence data store 60 may define one or more of look-up tables. For example, the entries in the look-up table(s) may be indexed by age and age difference. To calculate an identification confidence value, confidence measure calculator 110 would then use the age difference calculated at step S4-18 or S5-6 and the age associated with the representation data being tested as indices to read a value from the look-up table(s) defining the confidence value.

In the embodiments above, each image stored at steps S3-2 and S4-2 includes data identifying the recording date of the image, and processing apparatus 2 is arranged to read the image data to determine the recording date at steps S3-4 and S4-4. However, instead, the user may enter data defining the recording date of one or more images at step S3-2 and/or at step S4-2, and processing apparatus 2 may be arranged to read the date entered by the user at step S3-4 and/or at step S4-4.

In the embodiments above, processing is performed at step S3-4 to calculate and store a respective median age for each person. However, instead, one or more other ages may be stored for each person. For example, the youngest (or oldest) age calculated for a person may be stored.

In the embodiments above, if the recording date of an input image cannot be determined during the processing at step S3-4 or at step S4-4, then the current date (that is, the date on which processing apparatus 2 is operating) could be used to calculate the age of each person for that image at step S3-4 or at step S4-16. Such processing may, however, lead to inaccuracies if the time gap between the actual recording date of the image and the current date is large.

In the embodiments above, the processing at step S3-4 may be omitted, and instead the user may input a representative age for each person at step S3-2.

In the embodiments described above, the confidence data stored in confidence data store 60 defines the identification confidence value C(a, dt) to be a function of both the age ("a") of the person as represented in the representation data and the age difference of the person ("dt"). However, instead, the confidence data may define the identification confidence value to be a function only of age difference ("dt"), with the age ("a") being set to a constant value. In this way, at steps S4-20 and S5-8 confidence measure calculator 110 calculates the identification confidence value for a person in dependence of the age difference calculated at step S4-18 or step S5-6, but not in dependence upon the age associated with the representation data being tested. In addition, instead of calculating and storing a representative age for the representation data of each person at steps S3-4 and S3-8, a representative date may be stored. This date may comprise, for example, the median recording date of the training images for the person or the current date on which processing apparatus 2 is operating to perform training of face recogniser 80 (although using the current date may lead to errors if there is a large time gap between the current date and the actual recording date of the training images). By storing a representative date instead of a representative age for the representation data, the date of birth of each person need not be stored, steps S4-16 and S5-4 may be omitted and the processing at steps S4-18 and S5-6 comprises determining an age difference for each person as the recording date of the image on which face recognition processing is being performed or the current date on which the processing apparatus 2 is operating minus the date associated with the representation date for that person.

In the first embodiment described above, processing may be performed after step S4-14 to re-train the face recogniser 8 using the image data read at step S4-4.

In the second embodiment described above, the processing at step S5-2 may be replaced with a test to determine if the user has requested a check to be carried out to determine if any representation data is out-of-date or a test to determine if more than a predetermined amount of time (for example one month) has elapsed since the processing at steps S5-4 to S5-14 was previously performed.

In the second embodiment described above, the processing at steps S5-4 to S5-14 may be performed after the processing at step S5-16, so that the representation data is checked in response to a receipt of image data for face recognition processing. As a result, the processing at steps S5-4 and S5-6 may calculate the age and age difference for each person using the date on which the image on which face recognition processing is to be performed was recorded instead of the current date.

In the embodiments described above, processing is performed by a computer using processing routines defined by software programming instructions. However, some, or all, of the processing could, of course, be performed using hardware or firmware.

Other modifications and variations are, of course, possible.

THIRD EMBODIMENT

Referring to FIG. 6a, a third embodiment of the invention comprises a programmable processing apparatus 202, such as a personal computer, containing, in a conventional manner, one or more processors, memories, graphics cards etc., together with a display device 204 and user input devices 206, such as a keyboard, mouse etc.

The processing apparatus 202 is programmed to operate in accordance with programming instructions input, for example, as data stored on a data storage medium 212 (such as an optical CD ROM, semiconductor ROM, or magnetic recording medium, etc.), and/or as a signal 214 (for example an electrical or optical signal input to the processing apparatus 202, for example from a remote database, by transmission over a communication network such as the Internet or by transmission through the atmosphere), and/or entered by a user via a user input device 206 such as a keyboard.

As will be described in detail below, the programming instructions comprise instructions to program the processing apparatus 202 to become configured to train a face recogniser using images of a person's face at different ages of the person to generate a plurality of sets of representation data for the face recogniser. Each set of representation data characterises the face in the training images for a different age or age range of the person, and date information is stored for each set defining at least one recording date of the training images used to generate the representation data in the set. This training is repeated for the faces of different people to generate a plurality of respective representation data sets for each person. In this way, the trained face recogniser is operable to process input images using the generated representation data to recognise different faces in the input images. To perform face recognition processing on an input image, the apparatus compares the date on which the input image was recorded with the dates of the stored representation data sets. For each person, the representation data set is selected which represents the smallest age gap between the age of the person represented by the representation data and the age of that person when the input image was recorded. Face recognition processing is then performed using each of the selected representation data sets (that is, one for each person). Each input image processed by the trained face recogniser is stored in an image database together with data defining the name of each person's face recognised in the image. The database can then be searched in accordance with a person's name to retrieve images of that person.

When programmed by the programming instructions, the processing apparatus 202 can be thought of as being configured as a number of functional units for performing processing operations and a number of data stores configured to store data. Examples of such functional units and data stores together with their interconnections are shown in FIGS. 6a and 6b. The functional units, data stores and interconnections illustrated in FIGS. 6a and 6b are, however, notional, and are shown for illustration purposes only to assist understanding; as will be appreciated by the skilled person, they do not necessarily represent the units, data stores and connections into which the processors, memories, etc. of the processing apparatus 202 actually become configured.

Referring to the functional units shown in FIG. 6a, central controller 220 is arranged to process inputs from the user input devices 206, and also to provide control and processing for the other functional units. Working memory 230 is provided for use by central controller 220 and the other functional units.

Input data interface 240 is arranged to receive, and write to memory, image data defining a plurality of images for training the face recogniser. For each person for which the face recogniser is to be trained to perform face recognition, the training images comprise a plurality of sets of images, each set comprising images of the face of the person record at a different respective age or age range, together with data defining the name of the person. Input data interface 240 is further arranged to receive, and write to memory, input image data defining each image on which face recognition is to be performed by the trained face recogniser.

The input image data and the name data may be input to processing apparatus 202 as data stored on a storage medium 242, or as data carried by a signal 244. In this embodiment, the user defines which training images belong in which set.

Image data store 250 is configured to store the input image data defining the images to be used for training the face recogniser together with the associated name data, and the images on which face recognition is to be performed by the trained face recogniser.

Skin pixel detector 260 is operable to process image data from image data store 250 to detect areas within each image which represent human skin.

Face recogniser 270 is operable to use the training data from image data store 250 to generate representation data characterising each person's face in the training data. The generation of representation data is referred to as training to generate a trained face recogniser 270. More particularly, for each person, each set of training images is used to generate a respective set of representation data, such that each set of representation data characterises the person's face at a different age or age range of that person. Consequently, a plurality of sets of representation data are generated for each person.

The trained face recogniser 270 is operable to process image data from image data store 250 using the representation data generated during training to determine whether the image contains a face defined by the representation data and, if it does, to identify which of the faces the image contains.

The processing performed to train face recogniser 270 to generate representation data, the content of the representation data itself, and the processing performed by the trained face recogniser 270 to recognise a face in an input image will vary depending upon the type of face recogniser 270. In subsequent description, examples of the processing and representation data will be given for an exemplar-based face recogniser 270, a neural network face recogniser 270 and an eigenface face recogniser 270. However, face recogniser 270 is not restricted to these types and other types of face recogniser 270 are possible.

Representation data store 280, is configured to the store representation data for face recogniser 270, as schematically illustrated in FIG. 6b. More particularly, referring to FIG. 6b, representation data store 280 is configured to store a plurality of respective sets of representation data for each person that the face recogniser 270 has been trained to recognise. The number of sets of representation data may be different for each person. Associated with each set of representation data is a date which, in this embodiment, is a date specifying the median of the recording dates of the input training images used to generate the representation data in that set. As will be explained below, the dates associated with the representation data sets are used to select one representation data set for each person to be used in face recognition processing by the trained face recogniser.

Age difference calculator 290 is operable to calculate the difference between the recording date of an input image on which face recognition is to be performed by the trained face recogniser 270 and the date associated with each representation data set stored in representation data store 280. In this way, age difference calculator 290 is arranged to calculate a respective age difference for each representation data set representing the difference between the age of the person represented in the representation data set and the age of that person at the recording date of the input image on which face recognition processing is to be performed.

Representation data selector 300 is operable to select one representation data set for each respective person to be used by the trained face recogniser 270 in performing face recognition processing on an input image. Representation data selector 300 is arranged to perform this selection in dependence upon the age differences calculated by age difference calculator 290.

Image database 310 is configured to store image data from image data store 250 which has been processed by face recogniser 270. Image database 310 is also configured to store name data associated with each image identifying the people whose faces have been recognised in the image.

Database search engine 320 is operable to search the data in the image database 310 in accordance with a name input by a user using a user input device 206 such as a keyboard, to identify each image in the image database 310 which contains the face of the person with the input name. Database search engine 320 is further operable to enable a user to select one or more of the identified images from image database 310 and to display the selected image(s) on display device 204.

Display controller 330, under the control of central controller 220, is operable to control display device 204 to display image data received as input image data, and to display image data retrieved from image database 310. Output data interface 340 is operable to output data from processing apparatus 202 for example as data on a storage medium 342 (such as an optical CD ROM, semiconductor ROM or magnetic recording medium, etc.) and/or as a signal 344 (for example an electrical or optical signal transmitted over a communication network such as the Internet or through the atmosphere). In this embodiment, the output data comprises data defining the representation data from representation data store 280 and, optionally, data defining the face recogniser 270.

A recording of the output data may be made by recording the output signal 244 either directly or indirectly (for example by making a recording and then making a subsequent copy recording) using recording apparatus (not shown).

FIG. 7 shows the processing operations performed by processing apparatus 202 to train face recogniser 270 in this embodiment.

Referring to FIG. 7, at step S7-2, input data interface 240 stores input data in image data store 250 comprising a plurality of sets of images of each person that the face recogniser 270 is to be trained to recognise and name data defining the name of each person. As noted above, the different sets of training images for a particular person show the face of that person at different respective ages—that is, each respective set shows the face of the person at an age, or over an age range, different to that of the other sets. In this embodiment, each input image contains pixel data on which has been overlayed the recording data of the input image (this information being provided in a conventional way by recording each input image with a camera having a so-called "databack" which overlays the recording date on the image).

At step S7-4, the pixel data of each image stored at step S7-2 is read to determine the respective recording date of each input image. For each set of input images, the median recording date is then calculated and stored. In this way, a respective date is calculated for each set of input images representative of the range of dates over which the input images in that set were recorded.

At step S7-6, skin pixel detector 260 processes each training image stored at step S7-2 to detect skin pixels in the image. This processing is performed in a conventional way, for example as described in JP-A-11194051 or EP-A-1211638. The result of this processing is a respective skin pixel image (comprising the skin coloured pixels extracted from the input image data) for the face in each input image, and consequently a respective set of skin pixel images for each set of training images.

At step S7-8, face recogniser 270 is trained using the skin pixel image data generated at step S7-6 to generate representation data for subsequent use in face recognition processing. More particularly, face recogniser 270 is trained using each respective set of skin pixel images to generate a respective set of representation data.

The processing performed at step S7-8 and the representation data generated by the processing is dependent upon the type of the face recogniser 270.

For example, in an exemplar-based face recogniser 270, the processing at step S7-8 comprises, for each respective set of skin pixel images generated at step S7-6, storing image data defining each skin pixel image in the set and the associated median recording date for the set (calculated at step S7-4) to define a respective representation data set for the face recogniser 270. In this way, a plurality of respective dated sets of exemplars are stored in representation data store 280 for each person, each set comprising the corresponding skin pixel images generated at step S7-6.

In a neural network face recogniser 270, the processing at step S7-8 comprises, for each respective set of skin pixel images generated at step S7-6, processing to determine the synaptic weights for the links between the neurons in the neural network. This is performed, for example, using a back propagation technique to generate synaptic weights which give the same output value(s) from the neural network for each input skin pixel image in the set. The representation data stored in representation data store 280 therefore comprises a plurality of representation data sets for each person to be recognised, each set comprising a set of synaptic weights, the associated output value(s) generated by the neural network, and the median date for the set calculated at step S7-4. Suitable processing for training a neural network face recogniser at step S7-8 is described, for example, in "Face Recognition: A Convolutional Neural Network Approach" by Lawrence et al in IEEE Transactions on Neural Networks, Special Issue on Neural Networks and Pattern Recognition, Volume 8, Number 1, pages 98-113, 1997, and "Multilayer Perceptron in Face Recognition" by Oravec available at www.electronicsletters.com, paper Oct. 11, 2001 ISSN 1213-161×.

For an eigenface face recogniser 270, the processing at step S7-8 involves, for each respective set of skin pixel images generated at step S7-6, calculating the "eigenfaces" which characterise the variation in the skin pixel images in the set, these eigenfaces defining a multi-dimensional "face space". This is performed in a conventional way, for example as described in "Eigenfaces for Recognition" by Turk and Pentland in the Journal of Cognitive Neuroscience, Volume 3, Number 1, page 71-86). The processing comprises calculating an average face (represented by a vector) from the faces in the skin pixel training images in the set, calculating a respective difference vector for each skin pixel image in the set defining the difference between the skin pixel image and the average face, arranging the difference vectors in a "q" by "q" matrix (where q is the total number of skin pixel images in the set), calculating the eigenvectors and eigenvalues of the matrix, selecting the eigenvectors with the largest associated eigenvalues, and linearly combining the skin pixel images in the set in accordance with the selected eigenvectors to define a set of "eigenfaces" which define a "face space". A class vector in the "face space" characterising the face in the set of skin pixel images is then calculated by transforming each skin pixel image in the set into its eigenface components and calculating a vector that describes the contribution of each eigenface representing the face. An average of the calculated vectors is then calculated to define a class vector for the face in the set. In effect, the class vector for a person's face defines a region of face space characterising the face. A threshold value is then set defining a distance within the "face space" from the calculated class vector, this threshold distance defining a distance within which a vector calculated for a face to be recognised must lie to be identified as a face in that class (that is, to recognise the person as the person defined by that class vector). The processing described above is repeated for each respective set of skin pixel images. Accordingly, in an eigenface face recogniser 270, a plurality of sets of representation data are generated for each person, each set comprising data defining eigenfaces, a class vector (characterising the face of the person at a particular age or age range), and a threshold distance. FIGS. 8a and 8b show the processing operations performed by processing apparatus 202 containing the trained face recogniser 270 to perform face recognition processing on input image data.

It should be noted that a time delay may occur between the processing operations of FIG. 7 and the processing operations of FIG. 8 because the user may delay inputting image data upon which face recognition is to be performed.

Referring to FIG. 8, at step S8-2, input data interface 240 stores image data input to processing apparatus 202 in image data store 250 as image data on which face recognition is to be performed by the trained face recogniser 270. It should be noted that each image stored at step S8-2 may comprise a frame of video data or a "still" image. In this embodiment, each image contains information defining its recording date, this information being overlayed on the pixel image data of some of the pixels in a conventional way.

At step S8-4, image data for the next image to be processed is read from image data store 250 (this being image data for the first image the first time step S8-4 is performed), and the information identifying the recording date of the image is identified in the pixel data and read.

At step S8-6, processing is performed to select one of the representation data sets stored in representation data store 280 for each person.

FIG. 9 shows the processing operations performed at step S8-6 in this embodiment.

Referring to FIG. 9, at step S9-2, age difference calculator 290 reads the respective dates of the representation data sets stored in representation data store 280 for the next person (this being the first person for which representation data is stored the first time step S9-2 is performed).

At step S9-4, age difference calculator 290 calculates the difference between the recording date of the input image on which face recognition is to be performed (read at S8-4) and each date read at step S9-2. Each of these calculated differences therefore represents an age difference between the age of the person at the recording date of the image on which face recognition is to be performed and the age of the person represented in a representation data set.

At step S9-6, representation data selector 300 compares the differences calculated at step S9-4 and selects the representation data set having the smallest calculated difference as the representation data set to be used by face recogniser 270 for the face recognition processing. At step S9-8, representation data selector 300 determines whether the representation data sets for another person remain to be processed. Steps S9-2 to S9-8 are repeated until a respective representation data set has been selected for each person.

Referring again to FIG. 8, at step S8-8, skin pixel detector 260 detects skin pixels in the image data read at step S8-4 using processing the same as that performed at step S7-6, to generate a respective skin pixel image for each face in the input image. Accordingly, if there is more than one face in the input image, then more than one skin pixel image is generated at step S8-8.

At step S8-10, face recogniser 270 processes each skin pixel image generated at step S8-8 to perform face recognition processing using each respective set of representation data selected at step S8-6.

As with step S7-8, the processing performed at step S8-10 will be dependent upon the type of the face recogniser 270.

For example, for an exemplar-based face recogniser 270, the processing at step S8-10 comprises, for each selected representation data set, comparing the image data for each skin pixel image generated at step S8-8 with each exemplar image in the representation data set using conventional image comparison techniques. Such comparison techniques may comprise, for example, one or more of a pixel-by-pixel intensity value comparison of the image data, an adaptive least squares correlation technique (for example as described in "Adaptive Least Squares Correlation: A Powerful Image Matching Technique" by Gruen in Photogrammatry Remote Sensing and Cartography, 1985, pages 175-187), and detection of edges or other salient features in each image and processing to determine whether the detected edges/features align. In this way, for each skin pixel image generated at step S8-8, a respective match score is calculated for each exemplar in the selected set defining the accuracy of the match between the exemplar and the skin pixel image. This processing is repeated for each representation data set selected at step S8-6.

For a neural network face recogniser 270, the processing performed at step S8-10 for each selected representation data set comprises processing the image data of each skin pixel image generated at step S8-8 using the neural network and the synaptic weights defined by the representation data in the set to generate one or more output values.

For an eigenface face recogniser 270, processing may be performed at step S8-10 for each selected representation data set for example as described in "Eigenfaces for Recognition" by Turk and Pentland in the Journal of Cognitive Neuroscience, Volume 3, Number 1, page 71-86. For a given representation data set, this processing effectively comprises, for each skin pixel image generated at step S8-8, projecting the skin pixel image into the face space defined by the eigenfaces in the representation data, and then comparing its position in face space with the position of the face data for the person represented by the set (defined by the class vector in the representation data). To do this, for each skin pixel image, the image data generated at step S8-8 is transformed into its eigenface components, a vector is calculated describing the contribution of each eigenface representing the face in the image data, and the respective difference between the calculated vector and the class vector stored in the representation data is calculated (this difference effectively representing a distance in face space). This processing is repeated for each representation data set selected at step S8-6. As a result, the distance in face space between each skin pixel image and the image data of each person is calculated.

At step S8-12 face recogniser 270 determines whether a face has been recognised as a result of the processing at step S8-10.

In an exemplar-based face recogniser 270, the processing at step S8-12 comprises, for each skin pixel image generated at step S8-8, selecting the highest match score calculated at step S8-10 and determining whether the selected match score is above a threshold. In the event that the highest match score is above the threshold, then it is determined that the face of the person to which the matching exemplar relates has been identified in the input image.

For a neural network face recogniser 270, the processing at step S8-12 comprises, for each skin pixel image generated at step S8-8, calculating the difference between the output value(s) of the neural network at step S8-10 and the corresponding output value(s) for each person stored in the representation data sets selected at step S8-6 to generate difference values for each person. The smallest difference value(s) are then selected and compared with a threshold to determine whether the difference(s) are sufficiently small. If it is determined that the difference(s) are less than the threshold, then it is determined that the face of the person to which the representation data for the smallest difference(s) relates has been recognised in the input image.

For an eigenface face recogniser 270, the processing at step S8-12 comprises, for each skin pixel image generated at step S8-8, selecting the smallest distance value calculated at step S8-10 and determining whether it is within the threshold distance defined in the corresponding representation data (for example as described in "Eigenfaces for Recognition" by Turk and Pentland in the Journal of Cognitive Neuroscience, Volume 3, Number 1, page 71-86). If it is determined that the distance is less than the threshold, then it is determined that the face of the person corresponding to the class vector to which the smallest distance relates has been recognised in the input image.

It should be noted that the processing at step S8-8 may detect the skin pixels from more than one face and that, consequently, the processing at steps S8-10 and S8-12 may recognise more than one face in the input image.

If it is determined at step S8-12 that a face has not been recognised, then processing proceeds to step S8-14, at which the input image currently being processed is displayed on display device 204, together with a message prompting the user to enter data identifying each person in the input image being processed.

On the other hand, if it is determined at step S8-12 that a face has been recognised in the input image, then step S8-14 is omitted and processing proceeds directly to step S8-16.

At step S8-16, the image data read at step S8-4 is stored in the image database 310 together with data defining the name of each person whose face was recognised by the processing at steps S8-10 and S8-12 or who was identified by the user at step S8-14. In this way, image data and name data is stored in the image database 310 for subsequent searching and retrieval by the database search engine 320.

At step S8-18, a check is carried out to determine whether image data was stored at step S8-2 for another image on which face recognition is to be performed. Steps S8-4 to S8-18 are repeated until face recognition processing has been performed for each input image stored at step S8-2.

MODIFICATIONS AND VARIATIONS OF THE THIRD EMBODIMENT

Many modifications and variations can be made to the third embodiment described above within the scope of the claims.

For example, depending upon the type of face recogniser 270, skin pixel detector 260 and the processing operations performed thereby at step S7-6 and S8-8 may be omitted from the third embodiment.

In the third embodiment, each image stored at step S7-2 is used to train the face recogniser 270 at step S7-8. However, instead, the images within each set of input images may be processed to select images for training which are sufficiently different from each other and to discard non-selected images so that they are not used in the processing at steps S7-6 and S7-8.

In the third embodiment, the training images stored at step S7-2 for each person have already been sorted into their respective sets by the user. However, instead, the user need only identify the images for each person, and processing apparatus 202 may be arranged to process the images for a given person to read the recording dates thereof from the image data and to arrange the images in sets in dependence upon the determined recording dates, so that each set contains images of the person recorded on similar dates (representing the person at the same age or over the same, defined age range).

In the third embodiment, each image stored at step S7-2 and at step S8-2 includes data identifying the recording date of the image, and processing apparatus 202 is arranged to read the image data to determine the recording date at step S7-4 and at step S8-4. However, instead, the user may enter data defining the recording date of one or more images at step S7-2 and/or at step S8-2, and processing apparatus 202 may be arranged to read the date entered by the user at step S7-4 and/or at step 8-4.

In the third embodiment, processing is performed at step S7-4 to read the recording dates of the training images and to calculate and store a respective median recording date for each set of images. However, instead, one or more other dates may be stored for each set of images. For example, the earliest (or latest) recording date of the images in a given set may be stored for that set. As an alternative, instead of storing data relating to a recording date for each set of images, a user may input data at step S7-2 defining the age or age range of the person when the images for each set were recorded, and also data defining the date of birth of each person. In this case, the processing at step S7-4 then comprises storing a respective age for each set of images (such as the median age, youngest age, or oldest age, etc of the person when the images in the set were recorded). FIG. 10 shows the processing operations that would then be performed at step S8-6 to select a representation data set for each subject person to be used in face recognition processing.

Referring to FIG. 10, at step S10-2, age difference calculator 290 reads the respective age associated with each representation data set of the next person (this being the first person for which representation data is stored in representation data store 280 the first time step S10-2 is performed) and reads the person's date of birth (previously input at step S7-2).

At step S10-4, age difference calculator 290 calculates the age of the person at the recording date of the input image on which face recognition processing is to be performed. This comprises calculating the difference between the recording date of the input image read at step S8-4 and the person's date of birth read at step S10-2.

At step S10-6, age difference calculator 290 calculates the respective age difference between the age calculated at step S10-4 (defining the age of the person when the input image on which face recognition processing is to be performed was recorded) and the age associated with each representation data set. In this way, a respective age difference is calculated for each representation data set.

At step S10-8, representation data selector 300 compares the age differences calculated at step S10-6 and selects the representation data set having the smallest calculated age difference. The select representation data set is the representation data set to be used for the person in face recognition processing by the face recogniser 270.

At step S10-10, age difference calculator 290 determines whether representation data is stored in representation data store 280 for another person. Steps S10-2 to S10-10 are repeated until a respective representation data set has been selected for each person.

In the third embodiment, processing is performed by a computer using processing routines defined by software programming instructions. However, some, or all, of the processing could, of course, be performed using hardware or firmware.

Other modifications and variations are, of course, possible.

The invention claimed is:

1. Face recognition apparatus, comprising:
   a face recogniser trainable using image data defining a plurality of images of a face of a subject person to generate a trained face recogniser storing representation data characterising the face and operable to process image data defining an image using the representation data to determine if the image contains the subject person's face;
   a data store to store data identifying at least one age of the subject person characterised by the representation data as date data for the representation data;
   an age difference calculator operable to calculate an age difference for the subject person in dependence upon the stored date data for the representation data;
   a confidence measure calculator operable to calculate a confidence measure in dependence upon both the calculated age difference for the subject person and an age of the subject person characterised by the representation data, the calculated age difference being indicative of the reliability of the result of face recognition processing by the trained face recogniser using the representation data; and
   an output generator operable to generate an output in dependence upon the calculated confidence measure for alerting a user if the confidence measure indicates that the reliability of the result of face recognition processing may not be sufficiently high.

2. Apparatus according to claim 1, wherein the age difference calculator is operable to calculate the age difference in dependence upon the date on which the apparatus is operating and the date for the representation data.

3. Apparatus according to claim 1, wherein the age difference calculator is operable to calculate the age difference in dependence upon the date on which at least one image to be processed by the trained face recogniser was recorded and the date for the representation data.

4. Apparatus according to claim 1, comprising wherein:
   the trained face recogniser trainable has been trained using image data defining a plurality of images of a face of a subject person at different respective ages to generate a trained face recogniser and is storing a plurality of sets of representation data, each set comprising representation data characterising the face of the subject person at a different respective age, the trained face recogniser being operable to process image data defining an image using the representation data to determine if the image contains the subject person's face; and,
   the apparatus further comprising a representation data selector operable to select a set of the stored representation data for use by the trained face recogniser to process an input image, the selection being carried out in dependence upon date information identifying the recording date of the input image.

5. Apparatus according to claim 4, wherein:
   the trained face recogniser is operable to store respective date information for each set of representation data identifying at least one date representative of the date(s) on which the images used to train the face recogniser to generate the representation data in the set were recorded; and the representation data selector is operable to determine the difference between the recording date of the input image and the date associated with each representation data set and to select a representation data set in dependence upon the calculated differences.

6. Apparatus according to claim 4, wherein:
   the face recogniser is operable to store respective information for each set of representation data identifying at least one age of the subject person in the representation data of the set;
   the apparatus includes a data store is configured to store data defining the date of birth of the subject person; and
   the representation data selector is operable to calculate the age of the subject person in the input image to be processed in dependence upon the recording date of the input image and the date of birth of the subject person, compare the determined age with the age(s) associated with each respective set of representation data, and select a representation data set in dependence upon the result of the comparisons.

7. A method of controlling a face recognition apparatus having a trained face recogniser and stored representation data therefor characterising the face of a subject person, the method comprising:
   calculating an age difference for the subject person in dependence upon stored data identifying at least one age of the subject person characterised by the representation data as date data associated with the representation data;
   calculating a confidence measure in dependence upon both the calculated age difference for the subject person and an age of the subject person characterised by the representation data, the calculated age difference being indicative of the reliability of the result of face recognition processing by the trained face recogniser using the representation data; and
   generating an output in dependence upon the calculated confidence measure for alerting a user if the confidence measure indicates that the reliability of the result of face recognition processing may not be sufficiently high.

8. A computer program, stored in a computer-readable storage medium, comprising instructions to program a programmable processing apparatus to become operable to:
   generate a face recognition apparatus having a trained face recogniser and stored representation data therefor characterising the face of a subject person;
   calculate an age difference for the subject person in dependence upon stored data identifying at least one age of the subject person characterised by the representation data as date data associated with the representation data;
   calculate a confidence measure in dependence upon both the calculated age difference for the subject person and an age of the subject person characterised by the representation data, the calculated age difference being indicative of the reliability of the result of face recognition processing by the trained face recogniser using the representation data; and
   generate an output in dependence upon the calculated confidence measure for alerting a user if the confidence measure indicates that the reliability of the result of face recognition processing may not be sufficiently high.

* * * * *

UNITED STATES PATENT AND TRADEMARK OFFICE
CERTIFICATE OF CORRECTION

| | |
|---|---|
| PATENT NO. | : 7,362,886 B2 |
| APPLICATION NO. | : 10/856755 |
| DATED | : April 22, 2008 |
| INVENTOR(S) | : Simon Michael Rowe et al. |

It is certified that error appears in the above-identified patent and that said Letters Patent is hereby corrected as shown below:

TITLE PAGE:
      Item (56) Other Publications: "IEEE Transations" should read -- IEEE Transactions --.

COLUMN 1:
      Line 27, "page" should read -- pages --.

COLUMN 8:
      Line 23, "et al" should read -- et al. --; and
      Line 38, "page" should read -- pages --.

COLUMN 10:
      Line 1, "page" should read -- pages --; and
      Line 50, "page" should read -- pages --.

COLUMN 15:
      Line 56, "record" should read -- recorded --.

COLUMN 18:
      Line 36, "et al" should read -- et al. --; and
      Line 50, "page" should read -- pages --.

COLUMN 20:
      Line 39, "page" should read -- pages --.

COLUMN 21:
      Line 20, "page" should read -- pages --.

UNITED STATES PATENT AND TRADEMARK OFFICE
CERTIFICATE OF CORRECTION

PATENT NO. : 7,362,886 B2
APPLICATION NO. : 10/856755
DATED : April 22, 2008
INVENTOR(S) : Simon Michael Rowe et al.

It is certified that error appears in the above-identified patent and that said Letters Patent is hereby corrected as shown below:

COLUMN 22:
Line 30, "etc" should read -- etc., --.

Signed and Sealed this

Twenty-first Day of April, 2009

JOHN DOLL
*Acting Director of the United States Patent and Trademark Office*